(12) United States Patent
Hamaguchi et al.

(10) Patent No.: US 8,625,504 B2
(45) Date of Patent: Jan. 7, 2014

(54) RADIO TRANSMISSION DEVICE, CONTROL DEVICE, RADIO COMMUNICATION SYSTEM, AND COMMUNICATION METHOD

(75) Inventors: Yasuhiro Hamaguchi, Osaka (JP); Minoru Kubota, Osaka (JP); Hideo Namba, Osaka (JP); Shimpei To, Osaka (JP); Seiichi Sampei, Suita (JP); Shinichi Miyamoto, Suita (JP)

(73) Assignee: Sharp Kabushiki Kaisha, Osaka (JP)

( * ) Notice: Subject to any disclaimer, the term of this patent is extended or adjusted under 35 U.S.C. 154(b) by 438 days.

(21) Appl. No.: 12/521,103

(22) PCT Filed: Dec. 27, 2007

(86) PCT No.: PCT/JP2007/075139
§ 371 (c)(1),
(2), (4) Date: Jun. 24, 2009

(87) PCT Pub. No.: WO2008/081876
PCT Pub. Date: Jul. 10, 2008

(65) Prior Publication Data
US 2010/0098177 A1  Apr. 22, 2010

(30) Foreign Application Priority Data
Dec. 28, 2006 (JP) ................................ 2006-354426

(51) Int. Cl.
H04W 4/00 (2009.01)
H04W 72/00 (2009.01)
H04L 12/26 (2006.01)
H04J 1/00 (2006.01)
H04B 1/00 (2006.01)
H04B 7/00 (2006.01)

(52) U.S. Cl.
USPC ............. 370/329; 370/252; 370/480; 455/69; 455/450; 455/522

(58) Field of Classification Search
USPC ......... 370/203, 207–208, 252, 278, 329, 330, 370/480; 375/260, 297, 295; 455/126, 571, 455/450, 522, 69; 330/207
See application file for complete search history.

(56) References Cited

U.S. PATENT DOCUMENTS 4,370,622 A * 1/1983 Hornbeck et al. ......... 330/207 P
6,836,484 B2  12/2004 Suzuki
(Continued)

FOREIGN PATENT DOCUMENTS

| JP | 2001-238269 A | 8/2001 |
| JP | 2003-169036 A | 6/2003 |
| JP | 2003-304214 A | 10/2003 |
| JP | 2006-135417 A | 5/2006 |
| WO | WO 2005/046275 A1 | 5/2005 |

(Continued)

OTHER PUBLICATIONS

Anwar et al, PAPR Reduction of OFDM Signals Using Iterative Processing and Carrier Interferometry Codes, Nov. 2004.*

(Continued)

*Primary Examiner* — Redentor Pasia
(74) *Attorney, Agent, or Firm* — Birch, Stewart, Kolasch & Birch, LLP

(57) ABSTRACT

A radio communication system converts a time domain signal into a plurality of frequency signals to be allocated onto a plurality of subcarriers to be transmitted. The radio communication system changes a method of allocating the plurality of frequency signals onto the plurality of subcarriers based on transmission power information.

15 Claims, 21 Drawing Sheets

(56) References Cited

U.S. PATENT DOCUMENTS

| | | | |
|---|---|---|---|
| 6,904,283 B2 * | 6/2005 | Li et al. | 455/450 |
| 6,940,827 B2 * | 9/2005 | Li et al. | 370/278 |
| 7,203,156 B1 * | 4/2007 | Fukuda | 370/203 |
| 7,738,594 B2 * | 6/2010 | Zipper et al. | 375/297 |
| 2004/0228283 A1 * | 11/2004 | Naguib et al. | 370/252 |
| 2005/0128993 A1 * | 6/2005 | Yu et al. | 370/342 |
| 2005/0163067 A1 | 7/2005 | Okamoto et al. | |
| 2006/0034164 A1 * | 2/2006 | Ozluturk | 370/208 |
| 2006/0227888 A1 * | 10/2006 | Khan | 375/260 |
| 2007/0004465 A1 * | 1/2007 | Papasakellariou et al. | 455/571 |
| 2007/0149238 A1 * | 6/2007 | Das et al. | 455/522 |
| 2007/0230412 A1 * | 10/2007 | McBeath et al. | 370/338 |
| 2007/0263738 A1 * | 11/2007 | Jitsukawa et al. | 375/260 |
| 2007/0281635 A1 * | 12/2007 | McCallister et al. | 455/126 |
| 2010/0254484 A1 * | 10/2010 | Hamaguchi et al. | 375/295 |

FOREIGN PATENT DOCUMENTS

| | | |
|---|---|---|
| WO | WO 2006/004500 A2 | 1/2006 |
| WO | WO-2006/011524 A1 | 2/2006 |
| WO | WO 2006/052502 A2 | 5/2006 |
| WO | WO-2008/057969 A2 | 5/2008 |

OTHER PUBLICATIONS

Myung et al, Single Carrier FDMA for Uplink Wireless Transmission, Sep. 2006.*

3GPP R1-050702, "DFT-Spread OFDM with Pulse Shaping Filter in Frequency Domain in Evolved UTRA Uplink", NTT DoCoMo, NEC, SHARP, Aug. 29-Sep. 2, 2005, pp. 1-8.

Mashima et al., "Microscopic Spectrum Control Technique Using Carrier Interferometry for One-Cell Reuse Single Carrier TDMA Systems", The 17th Annual IEEE International Symposium on Personal, Indoor and Mobile Radio Communications (PIMRC'06).

* cited by examiner

FIG. 2
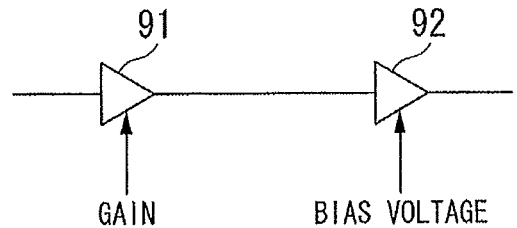
FIG. 3
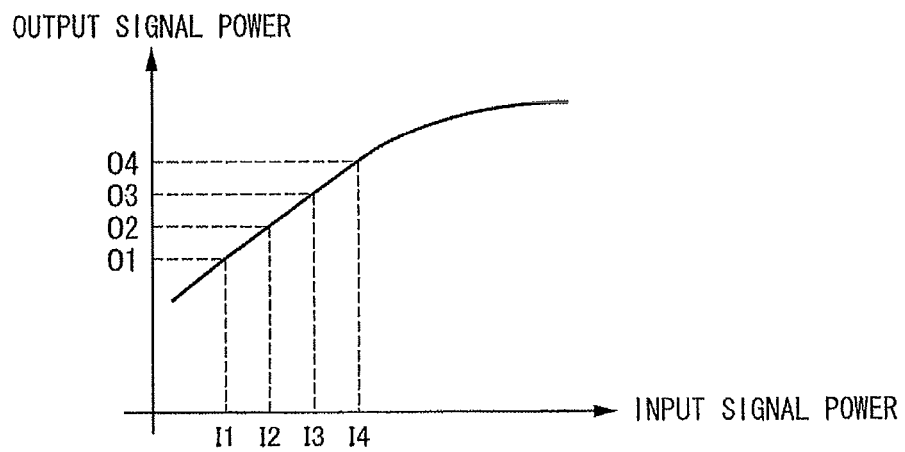
FIG. 4
| NUMBER OF FREQUENCY SIGNALS IN CLUSTER | 1 | 4 | 16 | 64 |
|---|---|---|---|---|
| HP AMPLIFIER OPERATING POINT | I1 | I2 | I3 | I4 |

FIG. 5
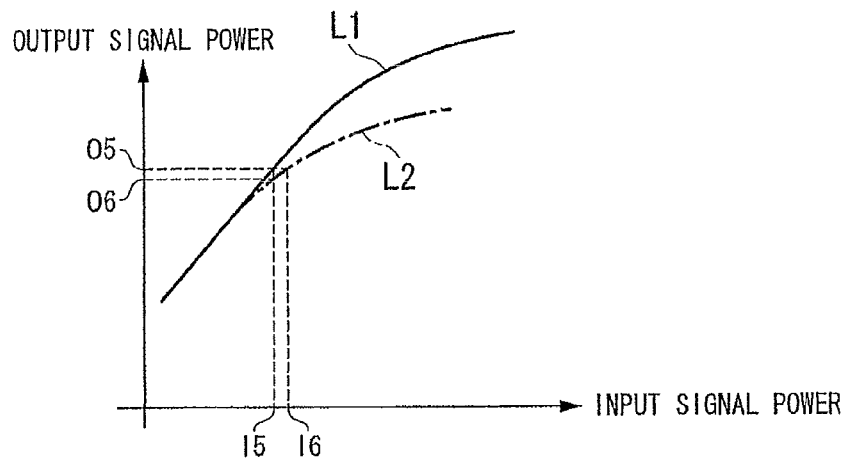
FIG. 6
| BIAS VOLTAGE | LARGE | SMALL |
|---|---|---|
| NUMBER OF FREQUENCY SIGNALS IN CLUSTER | 1, 4, 16, 64 | 16, 64 |
FIG. 7
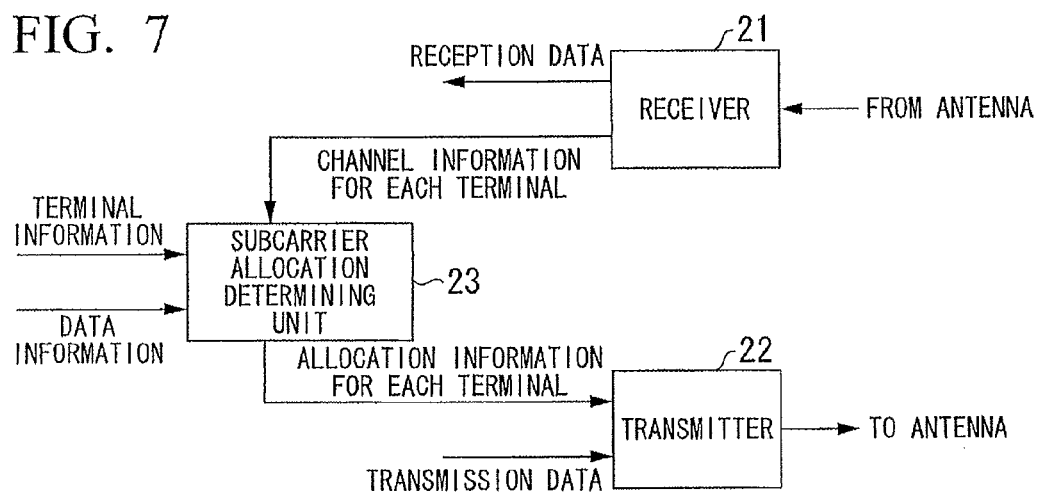

FIG. 8

| SUBCARRIER NUMBER | 1 | 2 | 3 | 4 | 5 | ? | 68 | 69 | ? | 72 | 73 | ? | 76 | 77 | ? | 92 | ? | 384 |
|---|---|---|---|---|---|---|---|---|---|---|---|---|---|---|---|---|---|---|
| ALLOCATED TERMINAL | a | a | a | a | b | b | b | a | a | a | 0 | 0 | 0 | c | c | c | ? | 0 |

MOBILE TERMINAL DEVICE A

MOBILE TERMINAL DEVICE B

MOBILE TERMINAL DEVICE C

FIG. 17

| NUMBER OF FREQUENCY SIGNALS IN CLUSTER | 1 | 4, 16, 64 |
|---|---|---|
| SIGNAL TO BE SELECTED | OFDM | SC^2 |

FIG. 18

DISTRIBUTED ALLOCATION (a) | 1 | 5 | 9 | 13 | 17 | 21 | 25 | 29 | 33 | 37 | 41 | 45 | 49 | 53 | 57 | 61 |

SUBCARRIER CANDIDATES TO BE USED
| 1 | 2 | 3 | 4 | 5 | 6 | 7 | 8 | 9 | 10 | 11 | 12 | 13 | 14 | 15 | 16 | 17 | ... | 64 |

L ALLOCATION
| 1 | 2 | 3 | 4 | 5 | 6 | 7 | 8 | 9 | 10 | 11 | 12 | 13 | 14 | 15 | 16 |

D ALLOCATION
| 1 | 5 | 9 | 13 | 17 | 21 | 25 | 29 | 33 | 37 | 41 | 45 | 49 | 53 | 57 | 61 |

R ALLOCATION
| 1 | 5 | 7 | 10 | 18 | 21 | 25 | 29 | 33 | 36 | 38 | 44 | 49 | 53 | 56 | 62 |

LS ALLOCATION
| 1 | 2 | 3 | 4 | 14 | 15 | 16 | 17 | 25 | 26 | 27 | 28 | 45 | 49 | 50 | 51 | 52 |

FIG. 29 BACKGROUND ART

| 1 | 2 | 3 | 4 | 5 | 6 | 7 | 8 | 9 | 10 | 11 | 12 | 13 | 14 | 15 | 16 |

LS8 ALLOCATION

| 10 | 11 | 12 | 13 | 14 | 15 | 16 | 17 |

LS4 ALLOCATION

| 1 | 2 | 3 | 4 | | | | | 14 | 15 | 16 | 17 | | | 25 | 26 | 27 | 28 | | | 45 | 46 | 47 | 48 | 49 | 50 | 51 | 52 |

LS2 ALLOCATION

| 4 | 5 | 7 | 8 | 10 | 11 | | | 18 | 19 | 25 | 26 | | | 33 | 34 | 43 | 44 | 45 | 49 | 50 | | | 61 | 62 |

LS1 ALLOCATION

| 1 | 5 | 7 | 10 | 18 | 21 | 25 | 29 | 33 | 38 | 43 | 44 | 49 | 53 | 56 | 62 |

RADIO TRANSMISSION DEVICE, CONTROL DEVICE, RADIO COMMUNICATION SYSTEM, AND COMMUNICATION METHOD

TECHNICAL FIELD

The present invention relates to a radio transmission device, a control device, a radio communication system, and a communication method. Particularly, the present invention relates to a radio transmission device, a control device, a radio communication system, and a communication method, which use spectrum controlled single carrier communication in which a cluster including one or more frequency signals is allocated to sequential subcarriers.

Priority is claimed on Japanese Patent Application No. 2006-354426, filed Dec. 28, 2006, the content of which is incorporated herein by reference.

BACKGROUND ART

Recently, next generation mobile communication systems have actively been researched, and a single frequency reuse cellular system in which the same frequency band is shared by multiple cells has been proposed as a method of enhancing the system frequency utilization efficiency.

OFDMA (Orthogonal Frequency Division Multiple Access) is most popular for downlink communication (from a base station device to a mobile station). In an OFDMA communication system, modulation, such as 64 QAM (64 Quadrature Amplitude Modulation) or BPSK (Binary Phase Shift Keying), is performed on information data to form OFDM signals to be used for communication. Then, a resource block which is an access unit defined by time and frequency axes is divided and assigned to multiple mobile terminal devices. Since OFDM signals are used, PAPR (Peak to Average Power Ratio) occasionally becomes very high. The high peak power does not cause a significant problem in downlink communication since a transmission power amplifying function is sufficiently performed in downlink. However, the high peak power causes a crucial problem in uplink communication (from a mobile station to a base station device) since the transmission power amplifying function is not sufficiently performed in uplink.

For this reason, single carrier communication systems in which PAPR is relatively small have been proposed for uplink communication, one of which is DFT-s-OFDM (Discrete Fourier Transform-spread-OFDM) (see Non-Patent Document 1). FIG. 24 is a transmitter block diagram. An encoder 111 performs, on input transmission data, error correction coding and then modulation such as BPSK to generate a time domain signal. Then, an S/P (Serial/Parallel) converter 101 converts the time domain signal into parallel signals. Then, a AFT (Discrete Fourier Transform) unit 102 performs a Fourier transform to convert the time domain signals into frequency signals, which are input to an IDFT (Inverse Discrete Fourier Transform) unit 105 through a subcarrier allocator 104 based on a rule which will be explained later. A 0 is assigned to each IDFT point having no input, and then IDFT is performed to generate a time waveform. Then, a GI (Guard Interval) inserter 106 inserts a guard interval into the time waveform. Then, a P/S (Parallel/Serial) converter 107 converts the waveform into a serial signal. Then, a D/A (Digital/Analog) converter 108 converts the serial signal into an analog signal. Then, an RF (radio frequency) unit 109 upconverts the analog signal into a radio frequency signal to be transmitted through an antenna (not shown). In a system in which multiple user data are multiplexed, the IDFT point number is set to be greater than the DFT point number, and subcarriers to which 0s are assigned are used by another mobile terminal device.

The data generated in this manner have small PAPR similarly to single carrier modulation. Further, frequency domain control can easily be performed since a frequency waveform is preliminarily generated by DFT.

Two frequency allocation methods have been proposed. One is L (Localized) allocation, and the other is D (Distributed) allocation. The L allocation is illustrated in FIG. 25(a) in which frequency data subjected to DFT is successively allocated to inputs of IDFT without changing the allocation of the frequency data. The D allocation is shown in FIG. 25(b) in which the same data is separately allocated at a given interval to the inputs of IDFT.

The L allocation achieves a diversity effect by each user selecting an adequate frequency band, i.e., a user diversity effect. The D allocation achieves the frequency diversity effect since a broader frequency band is used. However, subcarriers optimal for communication are not selected in both methods. Therefore, sufficient performance cannot be achieved especially in a channel condition in which frequency selectivity is strong or in a condition in which there are many interference signals from other cells.

On the other hand, single CI (Carrier Interferometry) has been proposed as a similar uplink communication system (see Non-Patent Document 2). In this method, transmission signals can be generated by the same signal generating method as DFT-s-OFDM. This reference document suggests an allocation rule more flexible than the aforementioned allocation rule.

In this method, frequency signals subjected to DFT are segmented into a few subcarriers, and subcarriers less affected by other cells are selected when allocated to the inputs of the IDFT unit (hereinafter, LS allocation). Thereby, subcarriers can be selected with higher communication precision compared to the aforementioned L allocation.

Additionally, an increase in PAPR can be reduced by increasing the number of frequency signals included in a cluster. Further, optimal subcarriers can be selected when the number of frequency signals in a cluster is assumed to be 1 (it is defined as R allocation since subcarriers are randomly allocated to the inputs of IDFT).

FIG. 26 illustrates an example of a PAPR distribution of outputs of the IDFT unit 105 in those methods. The horizontal and vertical axes denote PAPR (dB) per symbol and cumulative distribution (%), respectively, where the DFT point number is 16, the IDFT point number is 64, and time domain data is modulated based on BPSK. The PAPR denotes values compared to outputs of the IDFT unit 105. In FIG. 26, L, D, and R denote the L allocation, the D allocation, and the R allocation, respectively. S denotes an example of the LS allocation. The number of frequency signals in one cluster is assumed to be 4 in the LS allocation. FIG. 27 illustrates subcarriers to be used for the respective allocations.

As can be understood from the illustration, the L and D allocations have no difference in the PAPR characteristics. The R allocation has the greatest PAPR, and the LS allocation has the middle PAPR between that of the L (D) allocation and that of the R allocation.

FIG. 28 illustrates a PAPR distribution when the number of frequency signals included in a cluster, i.e., the number of subcarriers, is changed in the LS allocation. As shown in the subcarrier allocations in FIG. 29, the number of subcarriers for LS1 is 1 (identical to that for the R allocation). The number of subcarriers for LS2, LS4 (identical to that for the LS allocation shown in FIG. 26), and LS8 are 2, 4, and 8, respectively. The number of subcarriers for LS16 is 16, which is identical to that for the L allocation. As can be understood from FIG. 28, the greater the number of frequency signals included in a cluster is, the smaller the PAPR is.

In the present description, communication methods of generating single carrier signals by a multi-carrier signal generating method, such as DFT-s-OFDM or CI, and of controlling the generated spectra for communication are collectively called SC^2 (Spectrum Controlled Carrier Transmission).

Non-Patent Document 1: 3GPP R1-050702 "DFT-Spread OFDM with Pulse Shaping Filter in Frequency Domain in Evolved UTRA Uplink" NTT DoCoMo Non-Patent Document 2: The 17th Annual IEEE International Symposium on Personal, Indoor and Mobile Communications (PIMRC '06) "MICROSCOPIC SPECTRUM CONTROL TECHNIQUE USING CARRIER INTERFEROMETRY FOR ONE-CELL REUSE SINGLE CARRIER TDMA SYSTEM" Osaka University

DISCLOSURE OF THE INVENTION

Problems to be Solved by the Invention

However, waveforms of signals transmitted with the large transmission power by a radio transmission device for SC^2 which does not have sufficient performance of an amplifier, such as a mobile terminal device, are distorted in some cases.

The present invention is made in consideration of the above situations. An object of the present invention is to provide a radio transmission device, a control device, a radio communication system, and a communication method, by which waveforms of transmission signals in SC^2 are not distorted even if the transmission power is large.

Means for Solving the Problems

To solve the above problems, a radio transmission device of the present invention includes: a time-to-frequency converter that converts a time domain signal into a plurality of frequency signals; a subcarrier allocator that allocates the plurality of frequency signals onto a plurality of subcarriers; a transmission power adjustor that adjusts a transmission power of a transmission signal including the plurality of subcarriers; and a controller that controls the subcarrier allocator and the transmission power adjustor so that a peak-to-average power ratio determined by allocation of the plurality of subcarriers decreases as the transmission power increases.

Accordingly, the radio transmission device has small PAPR when the transmission power is large, and therefore can perform transmission without outputs of the amplifier being saturated. Thereby, waveforms of transmission signals can be prevented from being distorted.

A radio transmission device of the present invention includes: a time-to-frequency converter that converts a time domain signal into a plurality of frequency signals; a subcarrier allocator that segments the plurality of frequency signals into a plurality of blocks, and allocates the plurality of frequency signals included in each of the plurality of blocks onto sequential subcarriers; a transmission power adjustor that adjusts a transmission power of a transmission signal including the plurality of subcarriers; and a controller that controls the subcarrier allocator and the transmission power adjustor so that the number of frequency signals included in one block increases as the transmission power increases.

Accordingly, the number of frequency signals included in one block is large when the transmission power is large. Consequently, the radio transmission device has small PAPR, and therefore can perform transmission without outputs of the amplifier being saturated. Thereby, waveforms of transmission signals can be prevented from being distorted.

A radio transmission device of the present invention includes a transmission amplifier that amplifies a transmission signal including a plurality of subcarriers and supplies the transmission signal amplified to a transmission antenna. The radio transmission device further includes: a time-to-frequency converter that converts a time domain signal into a plurality of frequency signals; a subcarrier allocator that segments the plurality of frequency signals into a plurality of blocks, and allocates the plurality of frequency signals included in each of the plurality of blocks onto sequential subcarriers; and a controller that determines the number of the frequency signals included in one block based on a relationship between the number of frequency signals and a transmission power, the relationship being determined by saturation characteristics of outputs of the transmission amplifier, and on a desired power of an output signal from the transmission amplifier.

Accordingly, the radio transmission device controls the relationship between the number of frequency signals included in a block and the transmission power so as not to saturate outputs of the transmission amplifier such that the number of frequency signals is large when the transmission power is large. Consequently, the radio transmission device can perform transmission without outputs of the amplifier being saturated. Thereby, waveforms of transmission signals can be prevented from being distorted.

A radio transmission device of the present invention includes a transmission amplifier that amplifies a transmission signal including a plurality of subcarriers and supplies the transmission signal amplified to a transmission antenna. The radio transmission device further includes: a time-to-frequency converter that converts a time domain signal into a plurality of frequency signals; a subcarrier allocator that segments the plurality of frequency signals into a plurality of blocks, and allocates the plurality of frequency signals included in each of the plurality of blocks onto sequential subcarriers; and a controller that determines a desired power of an output signal from the transmission amplifier based on a relationship between the number of frequency signals and a transmission power, the relationship being determined by saturation characteristics of outputs of the transmission amplifier, and on the number of frequency signals included in one block.

Accordingly, the radio transmission device controls the relationship between the number of frequency signals included in a block and the transmission power not to saturate outputs of the transmission amplifier such that the number of frequency signals is small when the transmission power is small. Consequently, the radio transmission device can perform transmission without outputs of the amplifier being saturated. Thereby, waveforms of transmission signals can be prevented from being distorted.

In any of the above radio transmission devices, the relationship between the number of frequency signals and the transmission power is based on a bias voltage to be input to the transmission amplifier.

Accordingly, the radio transmission device can perform transmission without outputs of the amplifier being saturated even if the saturation characteristics of the transmission amplifier vary in accordance with a change in the bias voltage. Thereby, waveforms of transmission signals can be prevented from being distorted.

In any of the radio transmission devices, the relationship between the number of frequency signals and the transmission power is based on a power consumption mode.

Accordingly, the radio transmission device can perform transmission without outputs of the amplifier being saturated even if the saturation characteristics of the transmission amplifier vary in accordance with a change in a power consumption mode. Thereby, waveforms of transmission signals can be prevented from being distorted.

A control device of the present invention determines allocation of subcarriers to a plurality of radio transmission devices that convert a time domain signal into a plurality of frequency signals to be allocated onto the subcarriers to be transmitted. The control device includes a subcarrier allocation determining unit that determines subcarriers to be respectively allocated to the plurality of radio transmission devices so that a desired peak-to-average power ratio of a signal to be transmitted from each of the plurality of radio transmission devices is obtained.

Accordingly, the control device sets desired PAPRs of respective radio transmission devices to PAPRs by which the respective radio transmission devices can perform transmission without outputs of transmission amplifiers being saturated. Thereby, waveforms of transmission signals output from the respective radio transmission devices can be prevented from being distorted.

A control device of the present invention determines allocation of subcarriers to a plurality of radio transmission devices that convert a time domain signal into a plurality of frequency signals to be allocated onto the subcarriers to be transmitted. The control device includes a subcarrier allocation determining unit that determines subcarriers to be respectively allocated to the plurality of radio transmission devices based on information concerning a channel for each of the plurality of radio transmission devices and the number of frequency signals included in one block for each of the plurality of radio transmission devices.

Accordingly, the control device sets the number of frequency signals included in a block for each of the radio transmission devices to a value such that each of the radio transmission devices can perform transmission without outputs of a transmission amplifier being saturated. Thereby, waveforms of transmission signals output from the respective radio transmission devices can be prevented from being distorted.

In the control device, the subcarrier allocation determining unit preferentially determines subcarriers to be allocated to a radio transmission device having the greatest number of frequency signals included in one block.

Accordingly, the control device performs allocation preferentially to the radio transmission device requiring the greater number of sequential subcarriers unused, thereby enabling efficient subcarrier allocation.

A control device of the present invention determines allocation of subcarriers to a plurality of radio transmission devices that convert a time domain signal into a plurality of frequency signals to be allocated onto the subcarriers to be transmitted. The control device includes a subcarrier allocation determining unit that allocates, to the plurality of radio transmission devices, a plurality of subcarriers, some of which are allocated at different intervals and the rest of which are allocated at a given interval.

What difference occurs based on whether or not subcarriers are allocated at a given interval is explained hereinafter. If many subcarriers are allocated at a given interval such as the case of the D allocation, the PAPR characteristics are not likely to degrade. On the other hand, the PAPR characteristics degrade as more subcarriers at different intervals are allocated. In this case, however, flexibility of subcarriers to be selected increases, and thereby the error rate is improved.

According to the radio transmission device of the present invention, subcarrier allocation is performed with the subcarriers at a given interval and the subcarriers at different intervals being mixed. Therefore, flexible subcarrier allocation is enabled based on the respective allocation characteristics. For example, the number of subcarriers at different intervals is set small for a radio transmission device requiring the large transmission power, and thereby excellent PAPR can be obtained. On the other hand, the number of subcarriers at different intervals is set large for a radio transmission device requiring the small transmission power, and thereby the flexibility of subcarriers to be selected and the error characteristics can be enhanced.

In the control device, the subcarrier allocation determining unit determines allocation of subcarriers based on information concerning a channel for each of the plurality of radio transmission devices and the number of offset frequency signals for each of the plurality of radio transmission devices.

Accordingly, the number of subcarriers or subcarriers to be allocated can be determined based on information concerning a channel of the radio transmission device and the offset frequency signal number.

A control device of the present invention determines allocation of subcarriers to a plurality of radio transmission devices that convert a time domain signal into a plurality of frequency signals to be allocated onto the subcarriers to be transmitted. The control device includes a subcarrier allocation determining unit that determines subcarriers to be allocated to the plurality of radio transmission devices so that a desired peak-to-average power ratio determined based on a transmission power of each of the plurality of radio transmission devices or a communication distance to each of the plurality of radio transmission devices is obtained.

Accordingly, the control device sets PAPRs of respective radio transmission devices to values by which the respective radio transmission devices can perform transmission without outputs of transmission amplifiers being saturated while performing power control to make the reception powers from the radio transmission devices substantially constant. Thereby, waveforms of transmission signals output from the respective radio transmission devices can be prevented from being distorted.

In the control device, the subcarrier allocation determining unit determines the number of frequency signals included in one block for each of the plurality of radio transmission devices, and determines subcarriers to be allocated to the plurality of radio transmission devices based on the determined number of frequency signals and information concerning a channel for each of the plurality of radio transmission devices, so that a desired peak-to-average power ratio is obtained.

Accordingly, the control device sets the frequency signal number to a value such that PAPR by which the respective radio transmission devices can perform transmission without outputs of transmission amplifiers being saturated can be obtained, while performing power control to make the reception powers from the radio transmission devices substantially constant. Thereby, waveforms of transmission signals output from the respective radio transmission devices can be prevented from being distorted.

A radio communication system of the present invention includes a radio transmission device that converts a time domain signal into a plurality of frequency signals to be allocated to subcarriers to be transmitted, and a radio reception device that receives a signal transmitted from the radio transmission device. The radio transmission device allocates the plurality of frequency signals onto the subcarriers such that a peak-to-average power ratio of a signal to be transmitted decreases as a transmission power of the radio transmission device increases.

A radio transmission system of the present invention includes a radio transmission device that converts a time domain signal into a plurality of frequency signals, segments the plurality of frequency signals into a plurality of blocks, and allocates the plurality of frequency signals included in each of the plurality of blocks onto sequential subcarriers to be transmitted, and a radio reception device that receives a signal transmitted from the radio transmission device. The radio transmission device allocates the plurality of frequency signals onto the subcarriers such that the number of frequency signals included in one block increases as a transmission power of the radio transmission device increases.

A radio transmission system of the present invention includes a radio transmission device that converts a time domain signal into a plurality of frequency signals, segments the plurality of frequency signals into a plurality of blocks, and allocates the plurality of frequency signals included in each of the plurality of blocks onto sequential subcarriers to be transmitted, and a control device that receives a signal transmitted from the radio transmission device. The control device includes: a subcarrier allocation determining unit that determines the number of frequency signals included in a block for the radio transmission device based on a transmission power of the radio transmission device or a parameter for estimating a transmission power, and determines subcarriers to be allocated to the radio transmission device so as to fulfill the number of frequency signals; and an indicator that indicates information indicative of allocation of the subcarriers to the radio transmission device which is determined by the allocation determining unit to the radio transmission device. The radio transmission device includes: an allocation receiver that receives the information indicative of allocation of the subcarriers; and a subcarrier allocator that allocates the plurality of frequency signals onto subcarriers based on the information indicative of allocation.

A radio transmission system of the present invention includes a radio transmission device that converts a time domain signal into a plurality of frequency signals, segments the plurality of frequency signals into a plurality of blocks, and allocates the plurality of frequency signals included in each of the plurality of blocks onto sequential subcarriers to be transmitted, and a control device that receives a signal transmitted from the radio transmission device. The control device includes: a subcarrier allocation determining unit that determines the number of frequency signals included in a block for the radio transmission device based on a distance to the radio transmission device or a parameter for estimating the distance, and determines subcarriers to be allocated to the radio transmission device so as to fulfill the number of frequency signals; and an indicator that indicates information indicative of allocation of the subcarriers to be allocated to the radio transmission device which is determined by the allocation determining unit to the radio transmission device. The radio transmission device includes: an allocation receiver that receives information indicative of allocation of the subcarriers; and a subcarrier allocator that allocates the plurality of frequency signals onto subcarriers based on the information indicative of allocation.

In the communication system, the radio transmission device further includes: a distance estimator that estimates a distance from the control device to the radio transmission device; and a distance indicator that indicates the information indicative of the distance to the control device. The control device further includes a notice receiver that receives the information indicative of the distance from the radio transmission device. The allocation determining unit included in the control device determines the number of frequency signals included in a block for the radio transmission device based on the received information indicative of the distance.

In any of the above radio communication systems, the allocation determining unit allocates subcarriers belonging to the same region of a plurality of regions into which a frequency band to be used is divided to transmission devices having the same number of frequency signals.

In any of the radio communication systems, a plurality of OFDM signals are used instead of the plurality of frequency signals when the number of frequency signals included in the block is smaller than a threshold.

A communication method of the present invention is provided for a radio communication system including a transmitter that converts a time domain signal into a plurality of frequency signals to be allocated to subcarriers to be transmitted, and a controller that receives a signal transmitted from the transmitter. The communication method includes: a first step of the controller determining the number of frequency signals included in a block for a transmitter which is a transmission source based on a distance to the transmitter or a parameter for estimating the distance, and determining subcarriers to be allocated to the transmitter so as to fulfill the determined number of frequency signals; a second step of the controller indicating information indicative of allocation of the subcarriers determined in the first step to the transmitter; a third step of the transmitter receiving the information indicative of allocation of subcarriers from the controller; and a fourth step of the transmitter allocating the plurality of frequency signals to subcarriers based on the information indicative of allocation.

Effects of the Invention

According to the present invention, the greater the number of frequency signals included in a block is, the smaller PAPR is, thereby preventing waveforms of SC^2 signals from being distorted.

BRIEF DESCRIPTION OF THE DRAWINGS

FIG. 2 illustrates a connection relationship between a TPC amplifier 91 and an HP amplifier 92 included in an RF unit 9 according to the first embodiment.

FIG. 3 is a graph illustrating an example of a relationship between the signal input power and the signal output power of the HP amplifier 92 according to the first embodiment.

FIG. 4 is a chart illustrating an example of a relationship between the number of frequency signals included in a cluster and an operating point of the HP amplifier 92 (signal input power) according to the first embodiment.

FIG. 5 is a graph illustrating an example of a relationship between the signal input power and the signal output power of the HP amplifier 92 according to the first embodiment.

FIG. 6 is a chart illustrating an example of a relationship between a bias voltage and the number of frequency signals included in a cluster that can be used at the bias voltage.

FIG. 7 is a schematic block diagram illustrating the configuration of a base station device according to a second embodiment of the present invention.

FIG. 8 illustrates information stored in a table storing a relationship between subcarriers and mobile station devices using the respective subcarriers according to the second embodiment.

FIG. 17 illustrates a relationship between the number of frequency signals included in a cluster and a signal scheme to be selected according to the fourth embodiment.

FIG. 18 illustrates a subcarrier allocation method according to a fifth embodiment of the present invention.

FIG. 22 illustrates an example of subcarrier allocation according to the fifth embodiment.

FIG. 27 illustrates subcarriers to be used in each frequency allocation rule shown in FIG. 26.

FIG. 29 illustrates subcarriers to be used corresponding to the number of frequency signals shown in FIG. 28.

Figure 1:
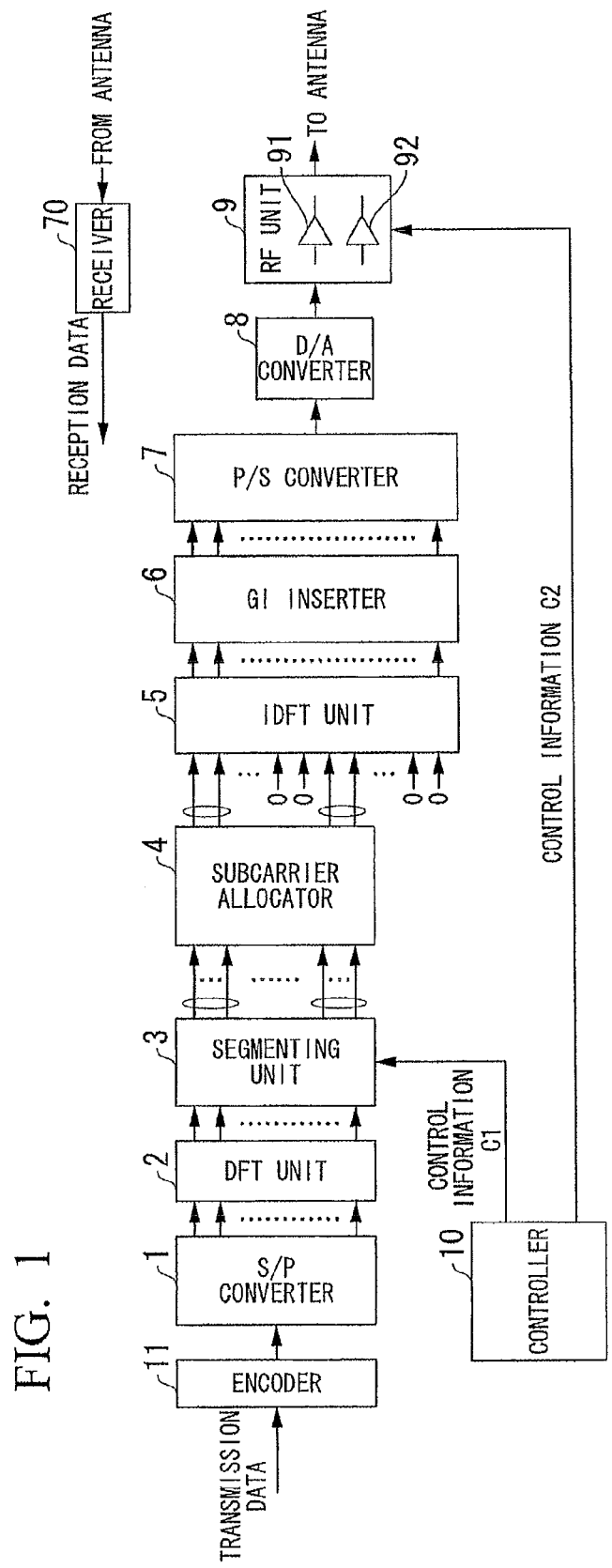
FIG. 1 is a schematic block diagram illustrating the configuration of a transmitter according to a first embodiment of the present invention.

DESCRIPTION OF REFERENCE NUMERALS 1 and 101 S/P converter
2 and 102 DFT unit
3 segmenting unit
4, 34, and 104 subcarrier allocating unit
5 and 105 IDFT unit
6 and 106 GI inserter
7 and 107 P/S converter
8 and 108 D/A converter
9 and 109 RF unit
10, 40, and 60 controller
11 and 111 encoder
21 and 51 receiver
22 and 52 transmitter
23 and 53 subcarrier allocation determining unit
41 receiver
42 subcarrier allocation receiver
43 distance estimator
44 distance indicator
61 signal selector
62 subcarrier modulator
91 TPC amplifier
92 HP amplifier

BEST MODE FOR CARRYING OUT THE INVENTION

It is assumed in the following embodiments that SC^2 is used in cellular uplink (from a mobile terminal device to a base station device), and the mobile terminal device accesses to the base station device by FDM (Frequency Division Multiplexing) and TDM (Time Division Multiplexing) per subcarrier. Additionally, it is assumed that the base station device can measure, by any method, SINR (Signal to Interference and Noise Power Ratio) for each subcarrier allocated to each mobile terminal device. As a simple method, for example, a method in which a mobile terminal device transmits a known signal so that a base station device can measure SINR of all subcarriers included in a band with a given period can be considered.

It is assumed in the following embodiments that the total number of subcarriers to be used for SC^2 is 384, and a mobile terminal device uses 64 subcarriers as a unit for access. In other words, the maximum simultaneous access number of mobile terminal devices is 6. The number of frequency signals included in one cluster differs for each mobile terminal device and is selected from 64 (corresponding to the L allocation when segmentation is not performed), 16, 4, and 1 (corresponding to the R allocation).

In the present invention, the number of frequency signals included in a cluster is changed for each mobile terminal device or a communication system. Hereinafter, embodiments of the present invention are sequentially explained.

First Embodiment

A first embodiment explains the configuration of a mobile terminal device that can perform frequency control for uplink SC^2.

FIG. 1 is a schematic block diagram illustrating the configuration of a mobile terminal device (radio transmission device) for SC^2 which can change the number of frequency signals included in a cluster according to the present invention.

In FIG. 1, reference numeral 11 denotes an encoder that performs error correction coding and modulation, such as BPSK or QPSK, on input transmission data to generate a time domain signal. Reference numeral 1 denotes an S/P (Serial/Parallel) converter that performs serial to parallel conversion on the time domain signal encoded by the encoder 1 to be input to a DFT unit 2. Reference numeral 2 denotes a DFT unit (time-to-frequency converter) that performs DFT on the time domain signal to generate a frequency signal. Reference numeral 3 denotes a segmenting unit that performs segmentation for each of the frequency signal numbers specified by control information C1 output from a controller 10. The segmenting unit 3 receives, in frame or the like, the number of frequency signals included in a cluster. Reference numeral 4 denotes a subcarrier allocating unit that allocates segmented frequency signals onto subcarriers to be transmitted. Reference numeral 5 denotes an IDFT unit that performs IDFT on the frequency signals allocated onto subcarriers. Reference numeral 6 denotes a GI inserter that inserts a guard interval (GI) defined by a system into an output of the IDFT unit 5. Reference numeral 7 denotes a P/S converter that performs parallel to serial conversion on an output of the GI inserter 6. Reference numeral 8 denotes a D/A (digital/analog) converter that converts a digital signal output from the P/S converter 7 into an analog signal.

The mobile terminal device according to the first embodiment shown in FIG. 1 performs transmission based on DFT-s-OFDM (see 3GPP, R1-050702, "DFT-spread OFDM with Pulse Shaping Filter in Frequency Domain in Evolved UTRA Uplink"). However, single-carrier CI (see the 17th Annual IEEE International Symposium on Personal, Indoor and Mobile Radio Communications (PIMRC '06) "MICROSCOPIC SPECTRUM CONTROL TECHNIQUE USING CARRIER INTERFEROMETRY FOR ONE CELL REUSE SINGLE CARRIER TDMA SYSTEMS") can be used for transmission instead of generating frequency signals by a Fourier transform performed by the DFT unit 2.

Reference numeral 9 denotes an RF (Radio Frequency) unit that performs, for example, frequency conversion on the analog signal output from the D/A converter 8 to be transmitted from an antenna (not shown). The RF unit 9 includes TPC (Transmission Power Control) amplifier (transmission power adjuster) 91 that can change a gain for transmission power control, and an HP (High Power) amplifier 92 that performs high-gain amplification on an output of the TPC amplifier 91. The HP amplifier 92 is an extremely-high gain amplifier, and amplifiers having various input and output characteristics can be used. Whatever amplifier is used, distortion of signals has to be considered if there is a possibility of the signals being amplified in a non-linear domain. The TPC amplifier 91 controls the transmission power by changing the gain based on control information C2 received from the controller 10. Additionally, the HP amplifier 92 performs bias voltage control based on the control information C2. The controller 10 generates the control information C1 and C2 and is implemented by dedicated hardware or software, but is not limited thereto. Reference numeral 70 denotes a receiver that receives a signal through an antenna (not shown), extracts reception data from the received signal, and outputs the extracted data.

Thus, the mobile terminal device according to the first embodiment includes the encoder 11, the S/P converter 1, the DFT unit 2, the segmenting unit 3, the subcarrier allocating unit 4, the IDFT unit 5, the GI inserter 6, the P/S converter 7, the D/A converter 8, the RF unit 9, the controller 10, and the receiver 70.

FIG. 2 is a schematic block diagram illustrating connection between the TPC amplifier 91 and the HP amplifier 92. The TPC amplifier 91 is an amplifier that can change a gain to a specified value in accordance with the transmission power required by, for example, a system, and can control the input power of the HP amplifier 92. Although the TPC amplifier 91 is taken as an example of a method of controlling the input power of the HP amplifier 92 in the first embodiment, the present invention is not limited thereto. For example, the input power of the HP amplifier 92 can be changed by an output of the D/A converter 9 being changed. The HP amplifier 92 is an amplifier that can control a bias voltage of an input signal with the gain fixed. Since the consumption power varies by a change in the bias voltage, the controller 10 instructs the HP amplifier 92 to lower the bias voltage in a low power consumption mode, and the HP amplifier 92 operates based on the instruction.

Hereinafter, two cases of relationships between control information C1 and C2 and operations of respective blocks.

Firstly, the case where a power range of linear amplification performed by the HP amplifier 92 is narrow is explained.

FIG. 3 illustrates an example of a relationship between the signal input power and the signal output power of the HP amplifier 92. Distortion is added to the gain as the input power increases from I1 to I4 (saturation characteristics appear in outputs). In this case, a linearly operating domain is smaller as the average power of input signals is closer to I4. Thereby, distortion is not negligible if signals having large PAPR and the large peak power are input.

If a base station determines the number of frequency signals included in a cluster, the number is read by the controller 10 and then input to the segmenting unit 3. To perform transmission without signals being distorted under these circumstances, the input power of the HP amplifier 92 has to be changed in accordance with the number of frequency signals included in a cluster.

FIG. 4 illustrates an example of a relationship between the number of frequency signals included in a cluster (input of the control information C1) and operating points of the HP amplifier 92 (changed by a gain of the TPC amplifier 91 being changed based on the control information C2). As shown in FIG. 4 illustrating the relationship between the number of frequency signals included in a cluster and operating points of the HP amplifier 92, in consideration of the saturation characteristics of the HP amplifier 92, as the number of frequency signals increases from "1", "4", "16", to "64", the corresponding operating points of the HP amplifier 92 increases from I1, I2, I3, to I4 (the gain of the TPC amplifier 91 and the output power of the HP amplifier also increase). By the controller 10 performing such control, communication with the distortion of signals maximally prevented can be achieved even if the transmission power increases. The control information C2 includes information for controlling the gain of the TPC amplifier 91. Based on the control information C2, the gain of the TPC amplifier 91 is controlled so that the input power of the HP amplifier 92 is a desired value which is any one of I1 to I4.

It has been explained here that the number of frequency signals included in a cluster is determined by the base station device, and the controller 10 receiving the frequency number information determines the operating point of the HP amplifier 92, i.e., the transmission power based on the number of frequency signals and the relationship shown in FIG. 4, i.e., the relationship between the transmission power and the number of frequency signals included in a cluster determined based on the saturation characteristics of the HP amplifier 92. However, inversely, the desired transmission power may be determined first, and the controller 10 receiving the transmission power information may determine the number of frequency signals included in a cluster based on the desired power and the relationship shown in FIG. 4, i.e., the relationship between the transmission power and the number of frequency signals included in a cluster determined based on the saturation characteristics of the HP amplifier 92.

Hereinafter, the case where a power range of linear amplification performed by the HP amplifier 92 is wide is explained.

A full line L1 shown in FIG. 5 illustrates an example of the relationship between the signal input power and the signal output power of the HP amplifier 92. The signal input and output powers are powers with bias elements removed. When the maximum transmission power required for the system is the signal output power O5, the signal input power of the HP amplifier 92 is I5. The linear characteristics maintain around the signal input power I5. In this case, transmission without signals being distorted is enabled even if PAPR of the signals increases. Therefore, signals can be transmitted with the number of frequency signals included in a cluster is 1, i.e., the R allocation, A dashed line L2 shown in FIG. 5 illustrates the characteristics when the bias voltage is lowered with respect to the same HP amplifier 92. The bias voltage is a signal to be superimposed onto input signals of the amplifier, the input and output characteristics of the amplifier is distorted unless an adequate voltage is applied, thereby degrading the saturation characteristics. If the bias voltage is set small, the saturation characteristics (linearity of the amplifier) degrade, but the consumption power can decrease. It is very effective means to decrease the bias voltage for reducing the consumption power of a mobile terminal device in a low power consumption mode, such as when residual battery is running short. However, the saturation characteristics degrade, thereby causing an increase in distortion of signals when the same output power is necessary. For this reason, the controller 10 limits the number of frequency signals included in a cluster as will be explained later based on a bias voltage to be applied, i.e., whether or not it is the low power consumption mode. Thereby, signals can be transmitted without the signals being distorted and the output power being greatly changed even if the mobile terminal device operates in the low power consumption mode.

FIG. 6 illustrates an example of the relationship between a bias voltage and the number of frequency signals included in a cluster. There are two cases where the bias voltages are large and small. The full line L1 shown in FIG. 5 corresponds to the characteristics when the bias voltage is large. The dashed line L2 corresponds to the characteristics when the bias voltage is small. When the number of frequency signals included in a cluster is controlled by the base station device, the base station device has to be indicated that the number of frequency signals included in a cluster is limited.

In this case, the controller 10 outputs the control information C1 indicative of the number of frequency signals included in a cluster which is limited by the bias voltage in use, and the control information C2 indicative of the bias voltage of the HP amplifier 92 or a signal for controlling the bias voltage.

In the low power consumption mode, the transmission power slightly degrades even if the signal input powers of the HP amplifier 92 are identical, as shown in FIG. 5. For example, when the signal input power is I5, the signal output power in the normal mode is O5, while the signal output power in the low power consumption mode is O6. This indicates that the communication coverage area might be smaller. In this case, it can be considered to increase the input power of the HP amplifier 92 to maintain the transmission power. In other words, an input of the HP amplifier 92 may be set to I6 in the case of the characteristics shown in FIG. 5. Even in this case, the number of frequency signals included in a cluster can preliminarily be set small to maximally prevent distortion of signals.

It has been explained in the first embodiment that the segmenting unit 3 is different from the subcarrier allocator 4. However, the processing of the segmenting unit 3 and the processing of the subcarrier allocator 4 may be implemented only by the subcarrier allocator 4 segmenting frequency signals included in a cluster and allocating the segmented frequency signals onto successive subcarriers upon allocating respective frequency signals onto subcarriers.

Thus, the mobile terminal device (radio transmission device) can vary the number of frequency signals included in a cluster and control the frequency signal number and the characteristics of the HP amplifier 92 which are correlated with each other. Thereby, the mobile terminal device can transmit transmission signals while preventing distortion of the transmission signals.

Additionally, the mobile terminal device (radio transmission device) can vary the number of frequency signals included in a cluster and control the frequency signal number and the transmission power which are correlated with each other. Thereby, the mobile terminal device can transmit transmission signals while preventing distortion of the transmission signals.

Further, the mobile terminal device (radio transmission device) can vary the number of frequency signals included in a cluster and control the frequency signal number and the bias voltage to be applied to the HP amplifier 92 which are correlated with each other. Thereby, the mobile terminal device can transmit transmission signals while preventing distortion of the transmission signals.

Moreover, the mobile terminal device (radio transmission device) can vary the number of frequency signals included in a cluster and control the frequency signal number in accordance with the power consumption modes of the mobile terminal device. Thereby, the mobile terminal device can transmit transmission signals while preventing distortion of the transmission signals even in the low power consumption mode.

Second Embodiment

Hereinafter, a method of allocating subcarriers of the SC^2 system to mobile terminal devices having the different number of frequency signals included in a cluster is explained in a second embodiment. It is assumed in the second embodiment that each mobile terminal device preliminarily indicates the allowable minimum number of frequency signals included in a cluster to a base station device (control device) that performs allocation. Based on the number of frequency signals included in a cluster indicated by each mobile terminal device, the base station device determines subcarriers to be allocated to each mobile terminal device. A subcarrier allocation determining unit 23 included in the base station performs a determination of subcarrier allocation and is usually implemented by software. Hereinafter, an example of allocation performed by the base station device is explained based on the schematic configuration of the base station device shown in FIG. 7, the flowchart shown in FIG. 9, and FIG. 8.

FIG. 7 is a block diagram illustrating the configuration of the base station device that is a control device including the subcarrier allocation determining unit 23 that determines uplink subcarrier allocation to each mobile terminal device. In FIG. 7, reference numeral 21 denotes a receiver that receives signals transmitted from the respective mobile terminal devices through an antenna, generates reception data from the received signals, and generates channel information including channel characteristics, such as SINR of signals for respective subcarriers transmitted from the respective mobile terminal devices. Reference numeral 22 denotes a transmitter that generates transmission signals from transmission data, transmits the generated signals through an antenna, and transmits control data to a mobile terminal device. Communication schemes to be used for the reception and the transmission are not particularly limited as long as the receiver 21 can recognize channel conditions of the respective mobile terminal devices, and the transmitter 22 can transmit control data. The subcarrier allocation determining unit 23 receives channel information concerning the respective mobile terminal devices which is generated by the receiver 21, data information including transmission priority (q), such as QoS (Quality of Service), which is received from the respective mobile terminal devices, and mobile terminal device information including the number (s) of frequency signals included in a cluster for each of the mobile terminal devices. With use of these information items, the subcarrier allocation determining unit 23 determines subcarrier allocation based on a flow that will be explained later, and outputs information indicative of the subcarrier allocation as control data to the transmitter 22, thereby indicating the information to the respective mobile terminal devices. As shown in FIG. 7, the data information and the mobile terminal device information may be input to the subcarrier allocation determining unit 23 from the outside of the base station device. Alternatively, the receiver 21 may receive those information items from the mobile terminal device and input those information items to the subcarrier allocation determining unit 23. Thus, the base station of the second embodiment includes the receiver 21, the transmitter 22, and the subcarrier allocation determining unit 23.

FIG. 8 illustrates information stored in a table storing the relationship between subcarriers and mobile terminal devices using the subcarriers. The subcarrier allocation determining unit 23 includes such a table as shown in FIG. 8 which stores the relationship between all of the subcarrier numbers and mobile terminal devices using the subcarriers. FIG. 8 indicates that subcarriers 1 to 4 and subcarriers 69 to 72 are used by a mobile terminal device a, subcarriers 5 to 68 are used by a mobile terminal device b, and subcarriers 77 to 92 are used by a mobile terminal device c. Since each of the mobile terminal devices uses 64 subcarriers in the second embodiment, the mobile terminal devices a and c are allocated the remaining subcarriers to other regions. 0s are assigned to subcarriers 73 to 76, which indicates that allocation is not performed.

After the allocation, the subcarrier allocation determining unit 23 outputs, as control data, information concerning all or part of the table to the transmitter 22. Then, the transmitter 22 indicates the control data through the downlink from the base station to each of the mobile terminal devices. Based on the indicated information, each of the mobile terminal devices allocates frequency signals onto subcarriers to be used in the uplink (from the mobile terminal device to the base station device).

Figure 9:
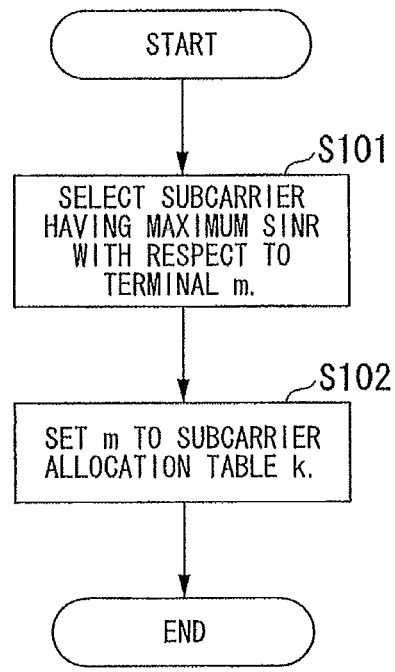
FIG. 9 is a flowchart illustrating a subcarrier allocation process performed by a subcarrier allocation determining unit 23 according to the second embodiment.

FIG. 9 is a flowchart illustrating a subcarrier allocation process performed by the subcarrier allocation determining unit 23. In Step S101, the subcarrier allocation determining unit 23 selects subcarriers having as good channel characteristics as possible to a mobile terminal device that performs allocation. For example, when allocation is to be performed for a mobile terminal device while no allocation has yet been performed, and 64 sequential subcarriers are to be selected, 321 patterns of subcarriers 1 to 64, subcarriers 2 to 65, ..., subcarriers 321 to 384 are considered since the number of frequency signals included in a cluster is 64. From among the 321 patterns, the subcarrier allocation determining unit 23 selects sequential 64 subcarriers having good characteristics based on the channel information. The number of frequency signals included in a cluster for the mobile terminal device which is included in the mobile terminal device information is used as the number of sequential subcarriers.

Step S102 is a step of updating the table. After the subcarrier allocation determining unit 23 determines allocation in step S101, the subcarrier allocation determining unit 23 sets a symbol of the determined mobile terminal device to the table at positions corresponding to the subcarrier numbers.

Figure 10:
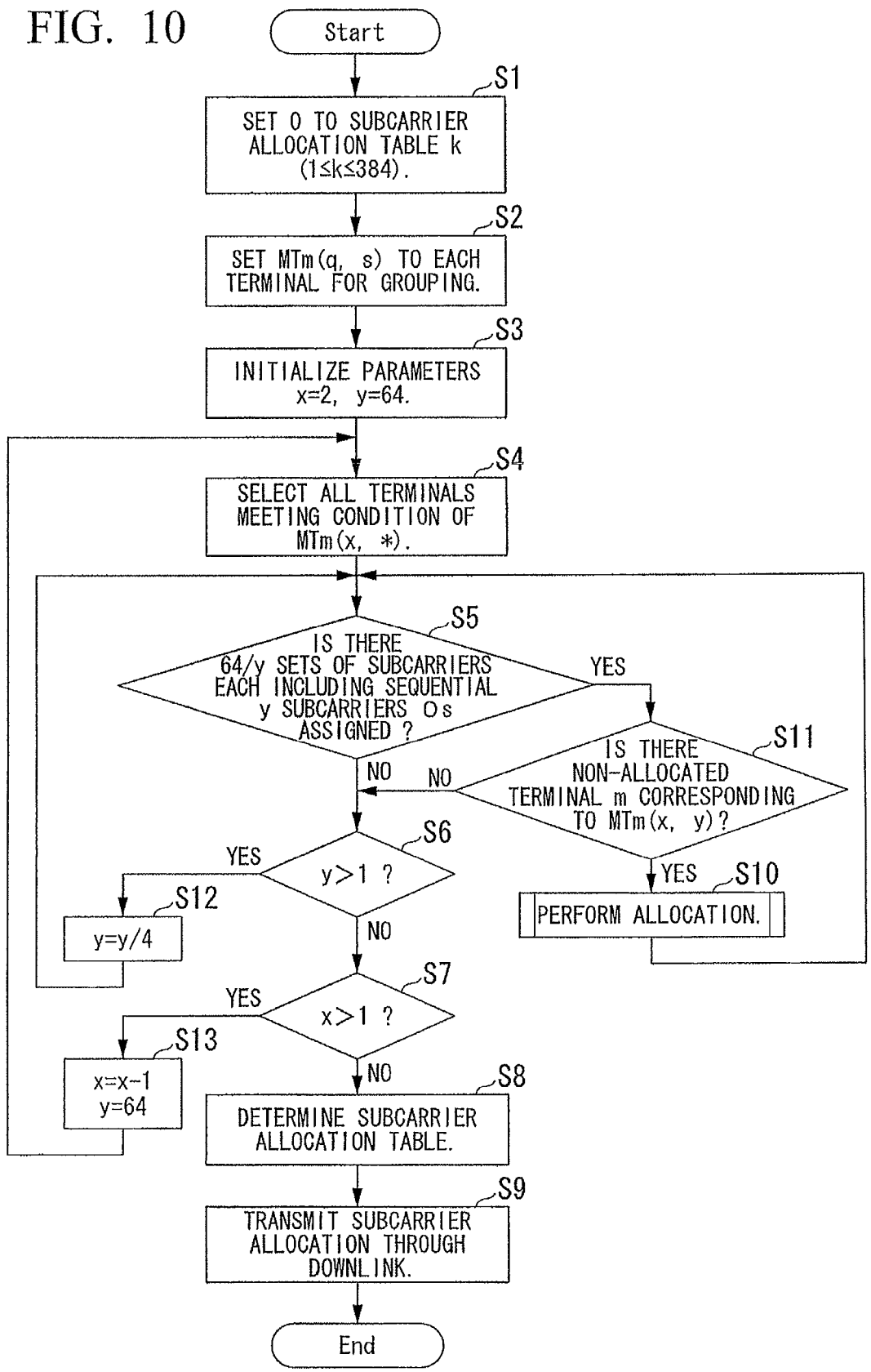
FIG. 10 is a flowchart illustrating operation performed by the subcarrier allocation determining unit 23 with respect to multiple mobile terminal devices according to the second embodiment.

FIG. 10 is a flowchart illustrating operation of the subcarrier allocation determining unit 23 performing allocation to each of multiple mobile terminal devices.

Steps S1 to S3 shown in FIG. 10 are an initializing process. Step S1 is a step of the subcarrier allocation determining unit 23 initializing the table to a state that no mobile terminal device is allocated to each subcarrier, i.e., inputting a 0 to every subcarrier number. Step S2 is a step of the subcarrier allocation determining unit 23 performing grouping of mobile terminal devices in a frame targeted for allocation. In step S2, grouping is performed based on transmission priority, such as QoS, which is included in the data information and the number of frequency signals included in a cluster which is included in the mobile terminal device information. This is denoted as MTm(q, s) with respect to a mobile terminal device m where q is transmission priority, and s is the number of frequency signals included in a cluster (corresponding to the subcarrier number). For simplification of explanation, the transmission priority q is an integer such that 0 (low priority) ≤q≤2 (high priority), and the frequency signal number s is any one of 1, 4, 16 and 64.

In step S3, the subcarrier allocation determining unit 23 initializes parameters. The subcarrier allocation determining unit 23 sets a parameter x concerning the transmission priority to x=2 which is the highest priority, and a parameter y concerning the subcarrier number to y=64 which is the greatest. In step S4, the subcarrier allocation determining unit 23 selects a mobile terminal device having the highest transmission priority from among unprocessed mobile terminal devices so that subcarriers are preferentially allocated to the mobile terminal devices having the greater transmission priorities.

In step S5, the subcarrier allocation determining unit 23 determines whether or not allocation to the mobile terminal device having the parameter y is enabled. It is assumed that the allocation is enabled if there are 64÷y sets of subcarriers, each set including sequential y subcarriers allocated 0, and otherwise the allocation is not enabled. For example, when y=64, 1 set of sequential subcarriers to which 0s are assigned is necessary. When y=16, 4 sets of sequential subcarriers to which 0s are assigned are necessary.

If it is determined in step S5 that allocation is enabled, the process proceeds to step S11 in which the subcarrier allocation determining unit 23 determines whether or not a mobile terminal device MTm(x, y) whose transmission priority is the parameter x and whose number of frequency signals included in a cluster is the parameter y is included in the mobile terminal devices selected in step S4. If such a mobile terminal device is included in step S11, the subcarrier allocation determining unit 23 performs subcarrier allocation to the mobile terminal device m found in step S10 based on the channel information. Then, the process returns to step S5 and repeats therefrom. If the condition is not fulfilled in step S5 or S11, the process proceeds to step S6.

The subcarrier allocation determining unit 23 determines whether or not y>1 in step S6. Then, the process from step S12 to step S5 repeats until this condition is not fulfilled. The subcarrier allocation determining unit 23 performs updates in step S12 by substituting y/4 for y. However, the embodiment is not limited to this equation as long as the process loops in descending order of allowable values of y since allowable values y=1, 4, 16, and 64 are first determined for convenience in accordance with the setting of the allowable number of frequency signals included in a cluster to 1, 4, 16, and 64.

If loops with respect to y end in step S6, allocation is similarly performed from step S7 by decrementing the transmission priority x. In step S13, the subcarrier allocation determining unit 23 decrements the transmission priority by substituting x−1 for x, and sets y=64 so that the process loops again with respect to the number of frequency signals included in a cluster. If the allocation process ends for every priority of the mobile terminal devices, a table is determined in step S8. If the subcarrier allocation determining unit 23 outputs allocation information to the transmitter 22 based on the determined table, the transmitter 22 indicates the allocation information to each of the mobile terminal devices through the downlink.

Thus, the subcarrier allocation determining unit 23 determines subcarriers to be allocated to the respective mobile terminal devices based on the channel information concerning channels, such as SINR of each mobile terminal device, and the number of frequency signals included in a cluster for each mobile terminal device. Thereby, subcarrier allocation is enabled so that the communication efficiency of each mobile terminal device is enhanced, Additionally, the subcarrier allocation determining unit 23 preferentially determines subcarriers to be allocated to a mobile terminal device having the greater number of frequency signals included in a cluster when determining subcarriers to be allocated to the respective mobile terminal devices. Thereby, the entire band can efficiently be allocated to the respective mobile terminal devices.

Further, the subcarrier allocation determining unit 23 preferentially determines subcarriers to be allocated to a mobile terminal device having the greater transmission priority, such as QoS, when determining subcarriers to be allocated to the respective mobile terminal devices. Thereby, the entire band can efficiently be allocated to the respective mobile terminal devices based on the order of transmission priority.

The allocation method explained above is one example, and the gist of the second embodiment is to perform allocation based on the transmission priority and the number of frequency signals included in a cluster.

Thus, the base station device (control device) performs allocation preferentially to a mobile terminal device having the greater number of frequency signals included in a cluster when determining subcarriers to be allocated to the respective mobile terminal devices. Thereby, subcarrier allocation can efficiently be performed.

Third Embodiment

A third embodiment explains the case where the SC^2 system is used in the uplink cellular system, and a mobile terminal device (radio transmission device) including a transmitter explained in the first embodiment is used.

When simultaneously accessed by multiple mobile terminal devices, the base station device (control device) can perform processing more easily in the case where the reception powers are identical (transmission power control). For this reason, it is necessary to increase the transmission power of a mobile terminal device far from the base station device and to decrease the transmission power of a mobile terminal device close to the base station device. As one method of identifying the distance from the base station device, the distance is calculated from the relationship between the powers of signals transmitted from the base station device and received by the mobile terminal device and the transmission powers of the base station device indicated from the base station with use of the fact that the longer distance causes the greater fading.

In a base station device of the present invention, the subcarrier allocation determining unit included in the base station device allocates sequential subcarriers to a mobile terminal device located far from the base station device, and freely allocates subcarriers to a mobile terminal device located close to the base station device. In other words, allocation is performed such that the greater number of frequency signals included in a cluster is set to the far mobile terminal device, and the smaller number of frequency signals included in a cluster is set to the close mobile terminal device. Thereby, PAPR of signals transmitted from the far mobile terminal device is small, and PAPR of signals transmitted from the close mobile terminal device is large.

Further, the larger transmission power is required for the far mobile terminal device in consideration of the transmission power control. However, the far mobile terminal device is allocated sequential subcarriers by the base station device, and the operating point of the HP amplifier can be higher. Therefore, the far mobile terminal device can transmit signals without the signals being distorted. On the other hand, the small transmission power is required for the close mobile terminal device, thereby the operating point of the HP amplifier can be lowered. This indicates that signals can be transmitted without being distorted even if subcarriers to be used are randomly allocated and PAPR is large.

Thus, a load on the HP amplifier included in a mobile terminal device can be reduced by linking the conventional transmission power control and the number of frequency signals included in a cluster, thereby reducing costs for mobile terminal devices without lowering the throughput of communication.

Figure 11:
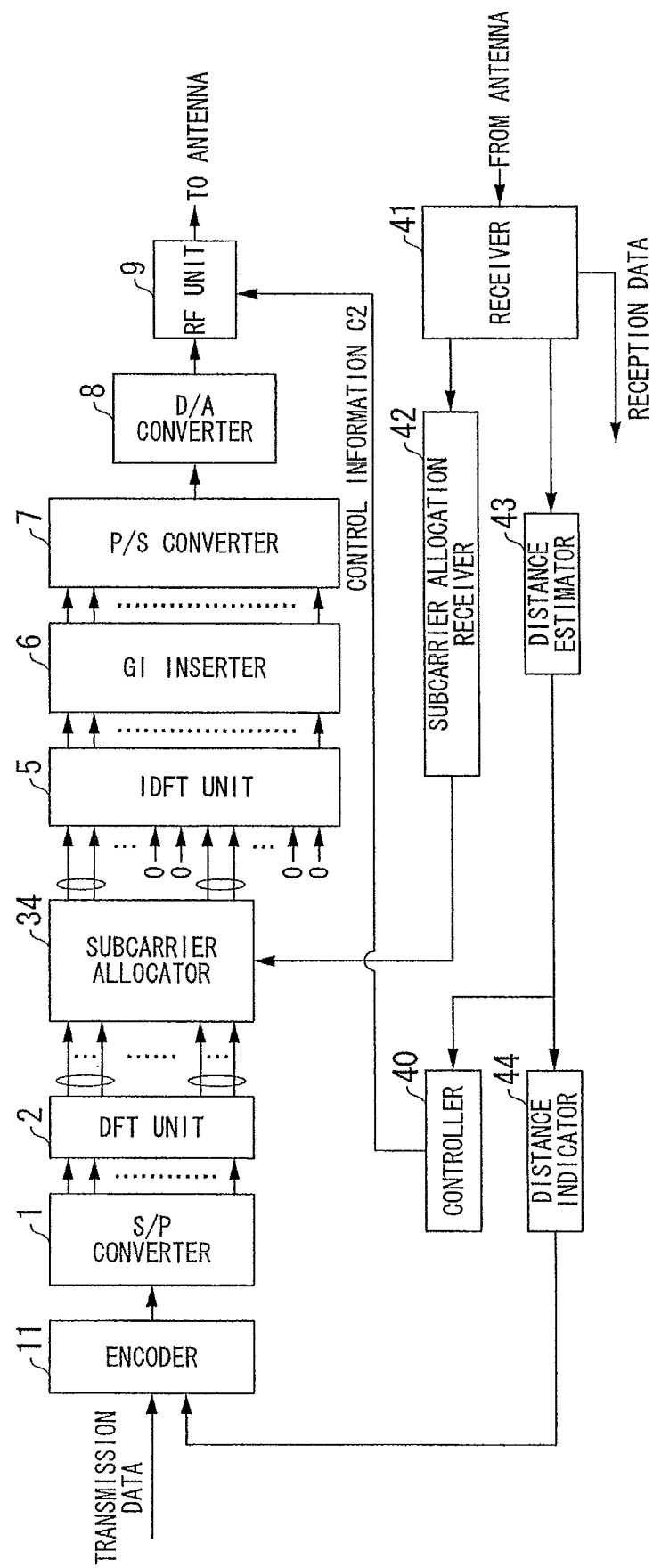
FIG. 11 is a schematic block diagram illustrating the configuration of a mobile terminal device according to a third embodiment of the present invention.

FIG. 11 is a schematic block diagram illustrating the configuration of a mobile terminal device according to the third embodiment. Like reference numerals between FIGS. 1 and 11 denote like units, and explanations thereof are omitted. Reference numeral 34 denotes a subcarrier allocator that receives information concerning subcarrier allocation to the mobile terminal device from a subcarrier allocation receiver 42, and performs subcarrier allocation based on the received information. Reference numeral 41 is a receiver that receives signals transmitted from the base station device through an antenna, and extracts reception data from the received signals. The subcarrier allocation receiver 42 obtains information concerning subcarrier allocation to the mobile terminal device which is included in control data from the signals received by the receiver 41, and outputs the obtained information to the subcarrier allocator 34. Reference numeral 43 is a distance estimator that estimates a distance to the base station based on the reception powers of the signals received by the receiver 41. Reference numeral 44 is a distance indicator that inputs information concerning the distance to the base station estimated by the distance estimator 43 to the encoder 11, and thereby transmits the information to the base station.

Reference numeral 40 denotes a controller that receives information concerning the distance to the base station estimated by the distance estimator 43, determines the gain of the TPC amplifier 91 so that the transmission power is larger as the distance increases, and outputs control information C2 including the gain to the RF unit 9. Thus, the mobile terminal device includes the encoder 11, the S/P converter 1, the DFT unit 2, the subcarrier allocator 34, the IDFT unit 5, the GI inserter 6, the P/S converter 7, the D/A converter 8, the RF unit 9, the controller 40, the receiver 41, the subcarrier allocation receiver 42, the distance estimator 43, and the distance indicator 44.

Figures 12, 13:
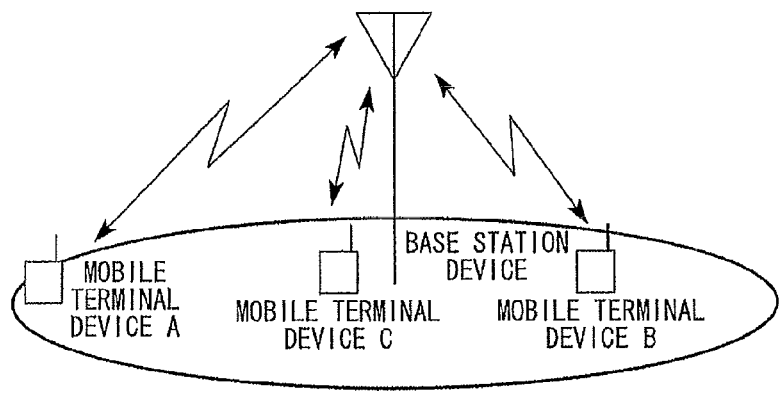
FIG. 12 illustrates a positional relationship between a base station device and mobile terminal devices according to the third embodiment.
FIG. 13 illustrates an example of subcarrier allocation when the base station device and the mobile terminal devices are in the positional relationship shown in FIG. 12 according to the third embodiment.

FIG. 12 illustrates an example of the positional relationship between the base station device and the mobile terminal devices. FIG. 13 illustrates an example of subcarrier allocation in the case of the positional relationship shown in FIG. 12. For simplification of the illustration, it is assumed that the total numbers of subcarriers to be used by mobile terminal devices A and C are equally 16, the total number of subcarriers to be used by a mobile terminal device B is 32, and the number of subcarriers included in the entire band is 64. In the example of the positional relationship shown in FIG. 12, the mobile terminal device A is the farthest from the base station device. The mobile terminal device B is the second farthest therefrom. The mobile terminal device C is the closest to the base station device. In this case, the mobile terminal device A farthest from the base station device requires a large transmission power, and therefore is allocated subcarriers such that the number of frequency signals included in a cluster is large (16 in the case of FIG. 13) so that PAPR is small. The mobile terminal device C closest to the base station device requires the small transmission power, and therefore is allocated subcarriers such that the number of frequency signals included in a cluster is small (1 in the case of FIG. 5) since PAPR may be large.

Figure 14:
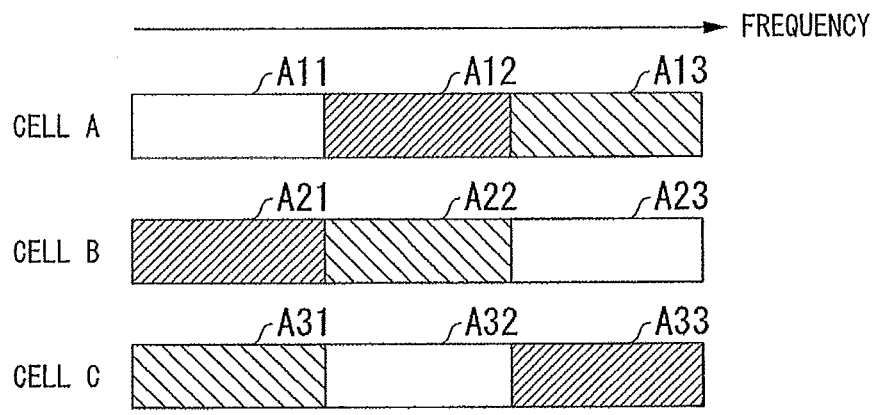
FIG. 14 illustrates an example of frequency division of cells according to the third embodiment.

Hereinafter, the case where inter-cell interference is further considered in the single-frequency reuse cellular system used in the uplink is explained. If subcarriers are allocated with the entire band as an allocation candidate in a manner explained in the second embodiment, and if there is one cell, an optimal allocation is enabled. If there is an interference cell, however, interference is randomly added in the frequency direction, thereby especially affecting a mobile terminal device having the large number of frequency signals included in a cluster. FIG. 14 illustrates a method of dividing a frequency domain candidate to reduce the effect of inter-cell interference in a single-frequency reuse cellular system in the third embodiment. For simplification of explanation, it is assumed that the division number in the frequency direction is 3, and the same allocation repeats every three cells. A guard band may be inserted between the divided frequency bands. The guard band is an unused band provided for reducing the effects on a system using an adjacent frequency and another channel.

FIG. 14 illustrates an example of frequency division of each cell. A cell A is divided into a white region A11, a densely hatched region A12, and a roughly hatched region A13 in this order toward a larger frequency direction. A cell B is divided into a densely hatched region A21, a roughly hatched region A22, and a white region A23 in this order toward the larger frequency direction. A cell C is divided into a roughly hatched region A31, a white region A32, and a densely hatched region A33 in this order toward the larger frequency direction. It is assumed that the number of frequency signals included in a cluster is 1 for the white regions A11, A23, and A32, 16 for the roughly hatched regions A13, A22, and A31, and 64 for the densely hatched regions A12, A21, and A33. The base station device allocates the densely hatched regions A12, A21, and A33 to a far mobile terminal device, the white regions A11, A23, and A32 to a close mobile terminal device, and the roughly hatched regions A13, A22, and A31 to an intermediately-located mobile terminal device.

The transmission power of a mobile terminal device is determined based on a distance to the base station device, thereby maintaining a balance of inter-cell interference with respect to the transmission power. The different numbers of frequency signals included in a cluster are set to the respective regions according to the transmission powers. Thereby, the number of subcarriers included in a cluster for each mobile terminal device is 1 in the white region in which the interference power from another cell is large. Therefore, optimal subcarriers can be selected, and interference control with respect to transmission powers and the frequency diversity effect can be achieved for each mobile terminal device.

Figure 15:
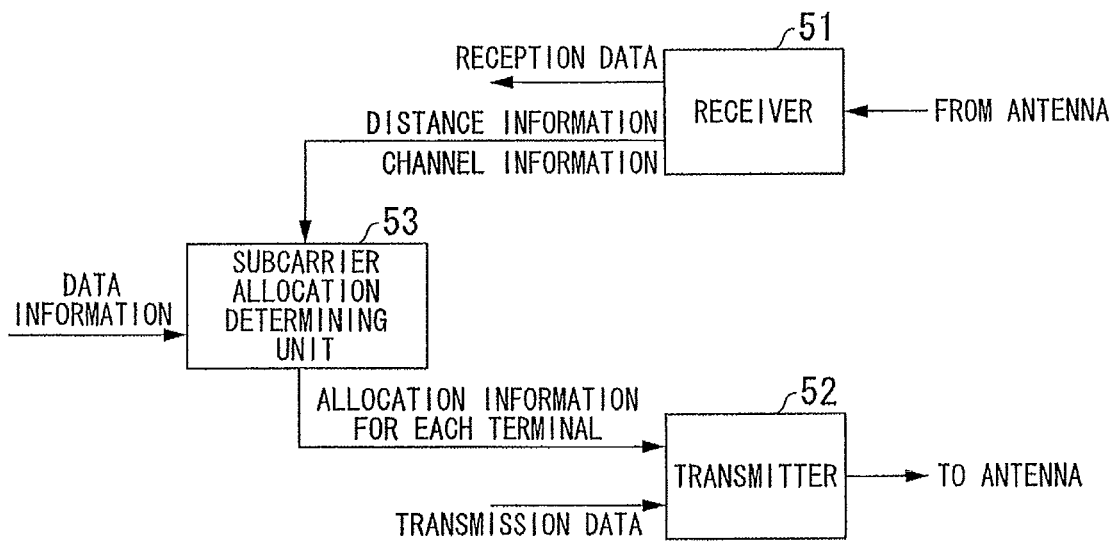
FIG. 15 is a schematic block diagram illustrating the configuration of the base station device according to the third embodiment.

FIG. 15 is a schematic block diagram illustrating the configuration of a base station device (control device) according to the third embodiment. Reference numeral 51 denotes a receiver that receives signals transmitted from mobile terminal devices through an antenna, extracts reception data from the received signals, generates channel information indicative of a channel, such as SINR of each subcarrier, from the received signals, and extracts information indicative of distances to the respective mobile terminal devices from the received signals. Reference numeral 52 denotes a transmitter that receives, as control data, information indicative of subcarrier allocation from the subcarrier allocation determining unit 53, and transmits the received control data to the respective mobile terminal devices. Upon receiving channel information and information indicative of the distances to the respective mobile terminal devices from the receiver 51, the subcarrier allocation determining unit 53 firstly determines the number of frequency signals included in a cluster for the mobile terminal device corresponding to the distance information based on the distance information. The number of frequency signals is determined based on the relationship between the distance and the number of frequency signals included in a cluster which is preliminarily stored based on the relationship between the distance and the transmission power, and the relationship between the transmission power and the number of frequency signals included in a cluster.

Additionally, the subcarrier allocation determining unit 53 determines subcarrier allocation to respective mobile terminal devices based on the number of frequency signals included in a cluster firstly determined, the channel information received from the receiver 51, and data information including the transmission priority, similarly to the subcarrier allocation determining unit 23. The subcarrier allocation determining unit 53 determines allocation for each of the frequency bands (the white region, the hatched region, and the black region shown in FIG. 14). Since the number of frequency signals included in a cluster is fixed in each of the frequency bands, allocation can be performed while the parameter y with respect to the numbers of frequency signals included in a cluster which is shown in the flowchart of FIG. 10 is fixed.

Although it is assumed in the first to third embodiments that the total number of subcarriers to be used by each mobile terminal device is identical, the present invention is not limited thereto. A mobile terminal device or a system that can vary the subcarrier number may be used. For example, the number of subcarriers to be used may differ for each mobile terminal device. Alternatively, the number of subcarriers to be used by each mobile terminal device may vary according to different situations. In any cases, similar effects can be achieved.

It has been explained in the third embodiment that the mobile terminal device transmits distance information to the base station device, and the subcarrier allocation determining unit 53 included in the base station device receiving the distance information determines the number of frequency signals included in a cluster. However, the mobile terminal device may include a transmission power indicator that transmits information concerning the transmission power determined by the controller 40 to the base station, so that the subcarrier allocation determining unit 53 included in the base station device receiving the information concerning the transmission power determines the number of frequency signals included in a cluster. Alternatively, the mobile terminal device may include a frequency signal number determining unit that determines the number of frequency signals included in a cluster based on the transmission power or the distance similarly to the subcarrier allocation determining unit 53, and a frequency signal number indicator that transmits information indicative of the determined number of frequency signals included in a cluster, so that the subcarrier allocation determining unit 53 included in the base station device receiving the information indicative of the number of frequency signals included in a cluster performs subcarrier allocation based on the received information.

The relationship between the transmission power and the number of frequency signals included in a cluster in the third embodiment is determined in accordance with the saturation characteristics of the HP amplifier 92 included in the mobile terminal device similarly to the first embodiment Thus, the base station device (control device) determines the number of frequency signals included in a cluster based on the transmission power of each mobile terminal device upon determining subcarriers to be allocated to each mobile terminal device. Thereby, efficient transmission power control can be achieved in a system including the base station device and the mobile terminal devices.

Additionally, a system having the high communication efficiency can be provided by combining the base station device and the mobile terminal devices explained in the third embodiment.

Further, a frequency by which access is performed is differentiated for each base station device based on the number of frequency signals included in a cluster. Thereby, a more efficient communication system can be provided in a single-frequency reuse system.

Fourth Embodiment

The first to third embodiments have explained the case where the SC^2 system is used regardless of the number of frequency signals included in a cluster. However, if the number of frequency signals included in a cluster is small, especially when the number of frequency signals included in a cluster is 1, the difference between the PAPR characteristics and multicarrier signals, such as signals of normal OFDM in which symbols subjected to modulation such as 64 QAM or BPSK are allocated to respective subcarriers, decreases.

The fourth embodiment explains a transmitter that transmits OFDM signals when the number of frequency signals included in a cluster is small.

Figure 16:
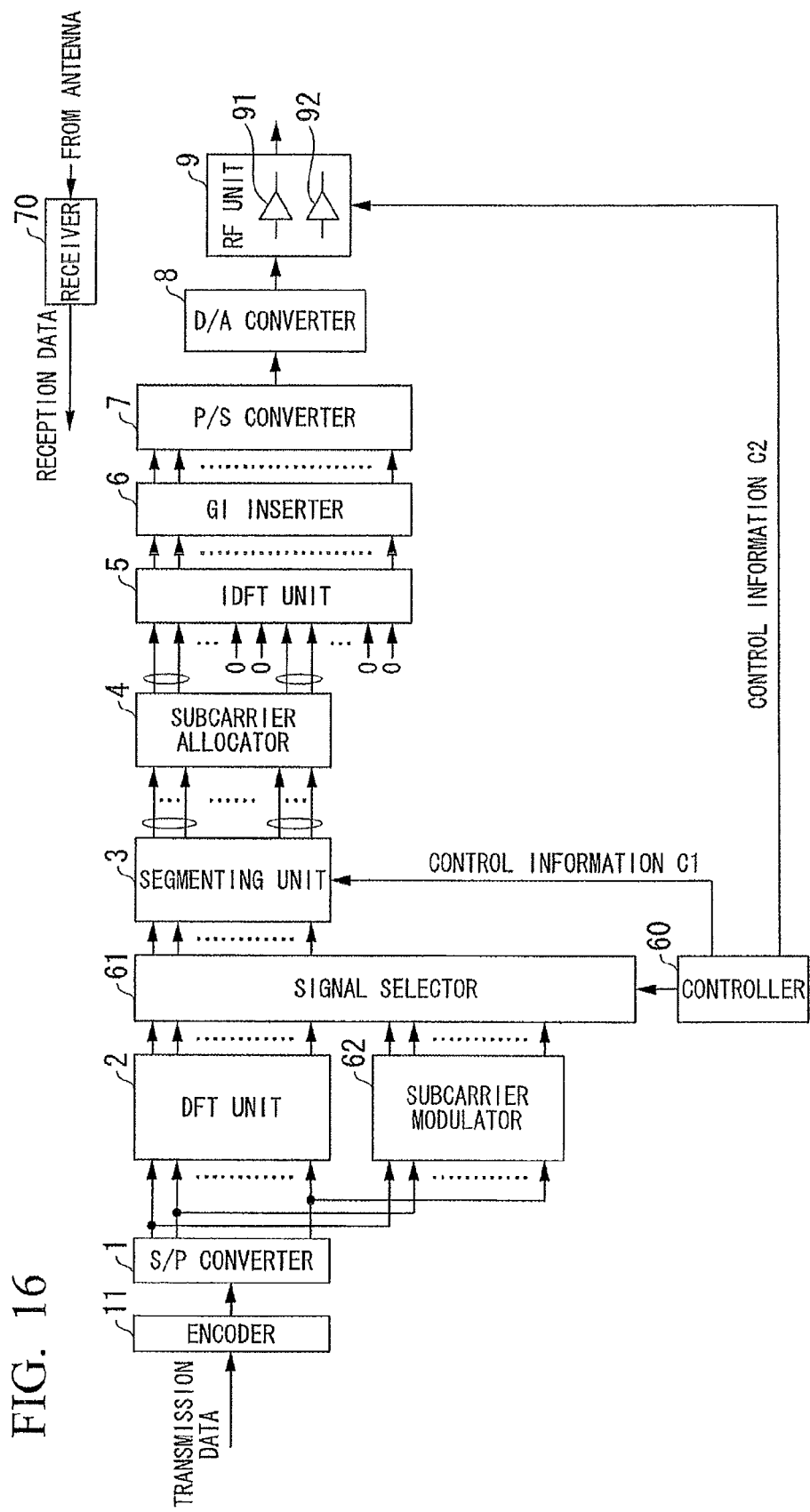
FIG. 16 is a schematic block diagram illustrating the configuration of a transmitter according to a fourth embodiment of the present invention.

FIG. 16 is a schematic block diagram illustrating the configuration of a transmitter according to the fourth embodiment. Like reference numerals between FIGS. 1 and 16 denote like units, and explanations thereof are omitted. In FIG. 16, reference numeral 62 denotes a subcarrier modulator that generates OFDM signals. Reference numeral 61 denotes a signal selector that selects SC ^2 signals or OFDM signals. When the number of frequency signals included in a cluster is 1, the controller 60 controls the signal selector 61 to select OFDM signals. Otherwise, the controller 60 operates in a similar manner as the controller 10. FIG. 17 illustrates the relationship between the number of frequency signals included in a cluster and signal format to be selected.

Compared to the SC^2 system, OFDM signals have a merit, such as that subcarrier adaptation modulation compatible with the MIMO (Multi-Input Multi-Output) system can be used, thereby enabling communication with the higher transmission efficiency.

A primary object of the present invention is to generate signals having different PAPR characteristics according to the characteristics of a transmission device or a system, and thereby to improve the communication efficiency. The aforementioned embodiments have explained the case where the PAPR characteristics are changed by changing the number of sequential subcarriers (the number of frequency signals included in a cluster) when signals having the different PAPR characteristics are generated, and subcarriers are allocated in the SC^2 system. In other words, large PAPR decreases by increasing the number of frequency signals included in a cluster, and thereby small PAPR increases, i.e., the PAPR characteristics are improved. The technology explained in those embodiments is one method of implementing the present invention, and another communication system can be adapted as long as the PAPR characteristics can be changed.

For example, an application of the Distributed system (D allocation) explained in the background art can be considered. The D allocation is a method of improving the PAPR characteristics by fixing intervals of subcarriers to be allocated. The PAPR characteristics can be changed by partially breaking the regularity of the allocation. If the regularity is broken and subcarriers having good SINR characteristics are selected, the PAPR characteristics degrade, but communication characteristics are enhanced, thereby enabling the transmission capacity to be improved. A communication system having different PAPR characteristics can be achieved by changing the subcarrier number to break the regularity. Thereby, similar effects as those of the first to fourth embodiments can be achieved.

Fifth Embodiment

The fifth embodiment explains a system in which the PAPR characteristics are changed by partially breaking the regularity of the D allocation regarded as a reference. FIG. 18 illustrates a subcarrier allocation method according to the fifth embodiment. Although a subcarrier allocation method has been explained in the background art, it is illustrated again in FIG. 18(a). Subcarrier allocation based on the D allocation indicates that subcarriers assigned at a given interval are used. FIG. 18(a) illustrates a method of allocating subcarriers at the four subcarrier interval with subcarrier 1 as the head. In other words, FIG. 18(a) illustrates a subcarrier allocation method in which subcarriers are allocated such that subcarrier 1 which is the head, subcarrier 5, subcarrier 9, . . . , subcarrier 61.

The D allocation achieves the excellent PAPR characteristics similarly to the case where the L allocation is used. FIG. 18(b) illustrates a subcarrier allocation method used in the fourth embodiment. In FIG. 18(b), the subcarriers selected in FIG. 18(a) are partially moved (the regularity is broken), Subcarriers 5, 33, and 61 shown in FIG. 18(a) are moved to subcarriers 6, 34, and 60 shown in FIG. 18(b). The PAPR characteristics degrade by the D allocation being partially moved. However, there are merits in that the flexibility of subcarriers to be selected is enhanced, and thereby the error rate characteristics are improved. Hereinafter, a subcarrier allocation method in which the regularity of the D allocation is partially broken is called offset D-allocation. Additionally, the number of subcarriers to partially break the regularity of the D allocation is called the offset frequency signal number.

Figure 19:
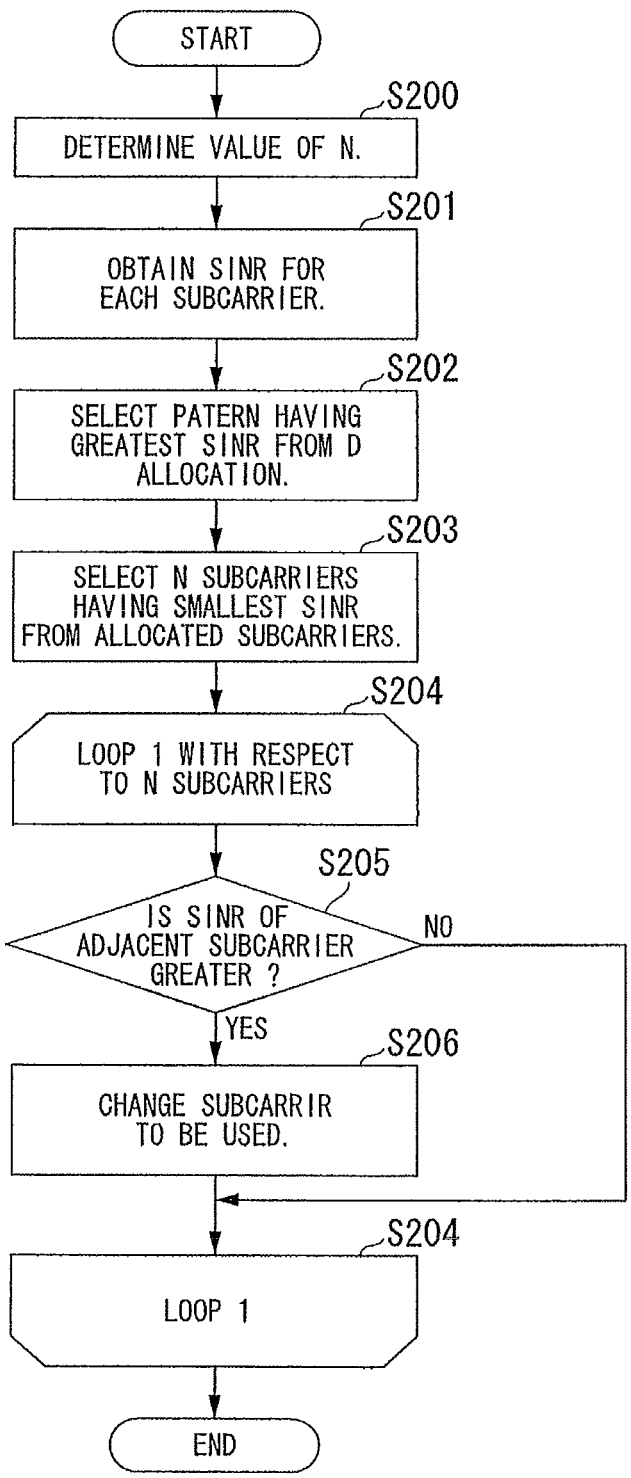
FIG. 19 is a flowchart illustrating a process of allocating subcarriers using an offset D allocation.

FIG. 19 is a flowchart illustrating a process of a subcarrier allocation determining unit 353 allocating subcarriers using the offset D-allocation. Hereinafter, a process of allocating subcarriers using the offset D-allocation is explained with reference to FIG. 19. For simplification, the case where there is one type of subcarrier interval m of the D allocation which is the basis is explained.

Step S200 shown in FIG. 19 is a step of determining a value of N indicative of the offset frequency signal number. A method of determining the offset frequency signal number will be explained later. Step S201 is a step of obtaining SINR that is channel quality of each subcarrier. The SINR is obtained by a measurement or a notification.

Step S202 is a step of selecting a pattern having the best SINR characteristics from the D allocation. If a subcarrier interval of the basic D allocation is m, there are m types of allocations, and one of the candidates is selected in step S202.

Step S203 is a step of selecting N subcarriers having the smallest SINR from the subcarriers selected as the D allocation. The subcarriers selected in this step are candidates to break the regularity.

Step S204 is a loop of a process performed on the subcarriers selected in step S203. The process of the loop is explained. Step S205 is a step of sequentially comparing the selected subcarriers with adjacent subcarriers. If SINR of the adjacent subcarrier is greater as a result of the comparison in step S205 (step S205: YES), the process proceeds to step S206. Step S206 is a step of changing subcarriers to be used. As adjacent subcarriers, left and right subcarriers, or one of the left and right subcarriers is regarded as a candidate. Alternatively, it can be considered that a subcarrier which is two subcarriers away is regarded as a candidate.

If SINR of the adjacent subcarrier is worse (smaller) than that of a target subcarrier in step S205 (step S205: NO), the loop repeats without exchanging subcarriers to be used. By executing such a flow, subcarrier allocation with the regularity being partially broken from the D allocation can be achieved.

Hereinafter, a method of determining a value of N indicative of the offset frequency signal number is explained. The offset frequency signal number is determined so that the desired PAPR characteristics are obtained with respect to signals transmitted from each mobile terminal device. For example, the offset frequency signal number is set small for a mobile terminal device located far from the base station device, i.e., a mobile terminal device requiring the large transmission power. On the other hand, the offset frequency signal number is set large for a mobile terminal device located close to the base station device, i.e., a mobile terminal device not requiring the large transmission power.

The offset frequency signal number may be determined by the mobile terminal device or the base station device. If the mobile terminal device determines the offset frequency signal number, each mobile terminal device indicates the offset frequency signal number to the base station device.

Hereinafter, a system according to the fifth embodiment is explained. It is assumed in the fifth embodiment that multiple mobile terminal devices simultaneously access to the base station device, and the base station device determines subcarriers to be used for data transmission performed by each of the mobile terminal devices.

Figure 20:
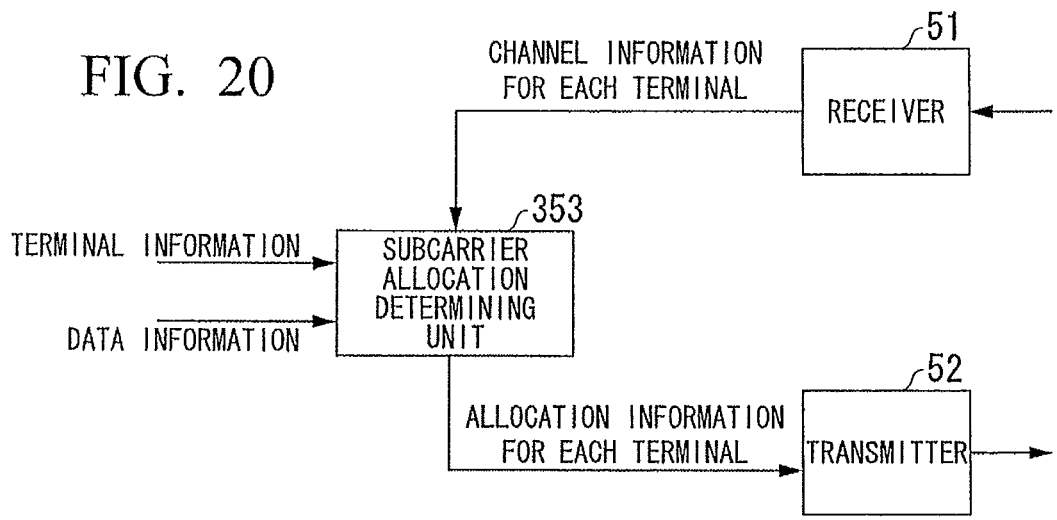
FIG. 20 is a schematic block diagram illustrating the configuration of the base station device having the subcarrier allocation function according to the fifth embodiment.

FIG. 20 is a schematic block diagram illustrating a base station device having a subcarrier allocation function according to the fifth embodiment. The system of the fifth embodiment is the same as that of the third embodiment except for the subcarrier allocation function. In other words, the receiver 51 estimates a channel through which data is transmitted from each mobile terminal device, and SINR of each subcarrier. Then, a subcarrier allocation determining unit 353 determines subcarriers to be used by each mobile terminal device, and the transmitter 52 indicates the determined subcarriers to each mobile terminal device. Like reference numerals between FIGS. 15 and 20 denote like units.

An algorithm of the subcarrier allocation determining unit 353 allocating subcarriers is different from that of the subcarrier allocation determining unit 53 shown in FIG. 15. The algorithm used by the subcarrier allocation determining unit 353 is the flow shown in FIG. 19.

The base station device in the fifth embodiment performs the following process. The subcarrier allocation determining unit 353 included in the base station device allocates subcarriers at a given interval to a mobile terminal device located far from the base station device. The subcarrier allocation determining unit 353 freely allocates subcarriers to a mobile terminal device located close to the base station device. In other words, any method of allocating subcarriers to a close mobile terminal device may be used. Additionally, the subcarrier allocation determining unit 353 allocates, to a mobile terminal device intermediately located, subcarriers based on the offset D-allocation at intervals whose regularity is broken to some extent from the D allocation.

According to the allocation process, as a mobile terminal device is farther from the base station device, i.e., the mobile terminal device requires the greater transmission power, the PAPR characteristics of signals to be transmitted are better. On the other hand, as a mobile terminal device is closer to the base station device, i.e., the mobile terminal device requires the smaller transmission power, the PAPR characteristics of signals to be transmitted degrade.

According to the aforementioned control, a mobile terminal device located far from the base station device requires the greater transmission power. However, such a mobile terminal device is allocated subcarriers at a given interval by the base station device, and thereby has excellent PAPR characteristics. For this reason, the above control enables signals to be transmitted without being distorted even if an operating point of the HP amplifier is set high.

On the other hand, a mobile terminal device located close to the base station device requires the small transmission power. For this reason, the operating point of the HP amplifier can be set lower. This indicates that signals can be transmitted without being distorted even if subcarriers to be used are randomly allocated and PAPR becomes large.

Figure 21:
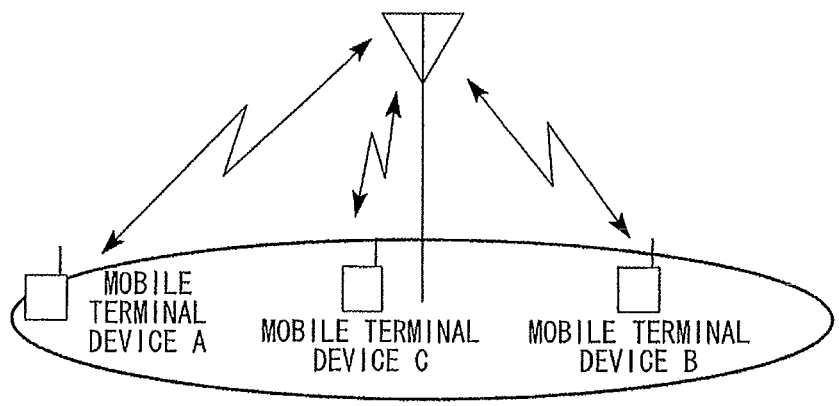
FIG. 21 illustrates a relationship among three mobile station devices and a base station device.
Figure 22:
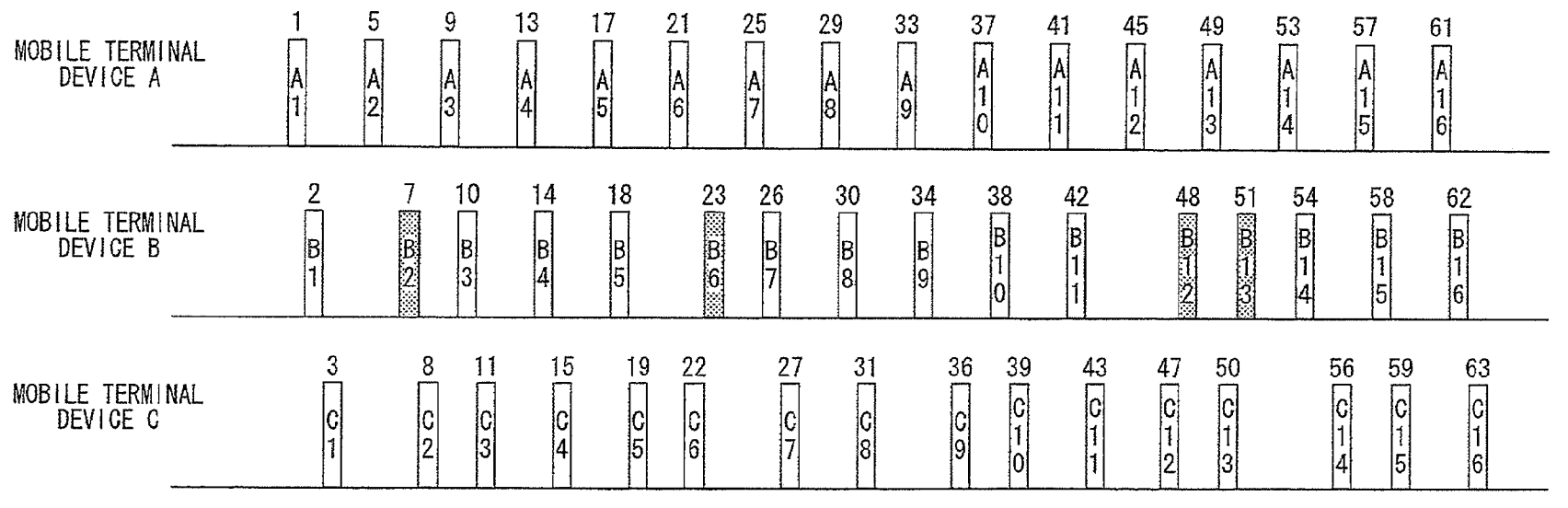

FIG. 21 illustrates an example of the positional relationship between the base station device and the mobile terminal devices. FIG. 22 illustrates an example of subcarrier allocation when the mobile terminal devices are in the positional relationship shown in FIG. 21. For simplification of illustration, it is assumed in FIG. 22 that the total number of subcarriers to be used by each mobile terminal device is 16, and the number of subcarriers included in the entire band is 64 (16 subcarriers are unused).

In the example of the positional relationship shown in FIG. 21, the mobile terminal device A is the farthest from the base station device. The mobile terminal device B is the second farthest therefrom. The mobile terminal device C is the closest to the base station device. In this case, the mobile terminal device A farthest from the base station device requires the large transmission power, and therefore is allocated subcarriers such that intervals among subcarriers to be allocated are fixed (4 subcarrier interval in the case of FIG. 22) so that PAPR is small. In other words, as 16 subcarriers (A1, A2, A3, . . . , A16) to be used by the mobile terminal device A, 16 subcarriers of subcarrier 1, subcarrier 5, subcarrier 9, . . . , subcarrier 61 are allocated. This is the same as the case shown in the flow of FIG. 19 where subcarriers are allocated with the offset frequency signal number N=0.

The mobile terminal device C closest to the base station device requires small transmission power, and therefore PAPR may be large. Therefore, subcarriers are allocated based on the R allocation without consideration of allocation intervals. In the case of FIG. 22, as 16 subcarriers (C1, C2, C3, . . . , C16) to be used by the mobile terminal device C, 16 subcarriers of subcarrier 3, subcarrier 8, subcarrier 11, . . . , subcarrier 63 are allocated. Thus, intervals among subcarriers to be allocated to the mobile terminal device C are not identical. This is the same as the case shown in the flow of FIG. 19 where subcarriers are allocated with the offset frequency signal number N=16.

The mobile terminal device B which is the second farthest from the base station device performs allocation by shifting a part of subcarriers from the positions set at a given interval based on the offset D-allocation. In the case of FIG. 22, 16 subcarriers of subcarrier 2, subcarrier 7, subcarrier 10, subcarrier 62 are allocated to the mobile terminal device B as 16 subcarriers (B1, B2, B3, . . . , B16) to be used by the mobile terminal device B. The hatched subcarriers (subcarrier 7, subcarrier 23, subcarrier 48, subcarrier 51) are subcarriers whose positions are shifted based on the offset D-allocation. In this case, subcarrier C12 is shifted by two subcarriers from the original position of the D allocation. Thus, a shifted degree is not limited to "1". The case of FIG. 22 corresponds to the case where N=4 in the flowchart of FIG. 19 and all of the subcarriers selected in step S203 (the hatched subcarriers in the illustration) are changed.

Sixth Embodiment

Figure 23:
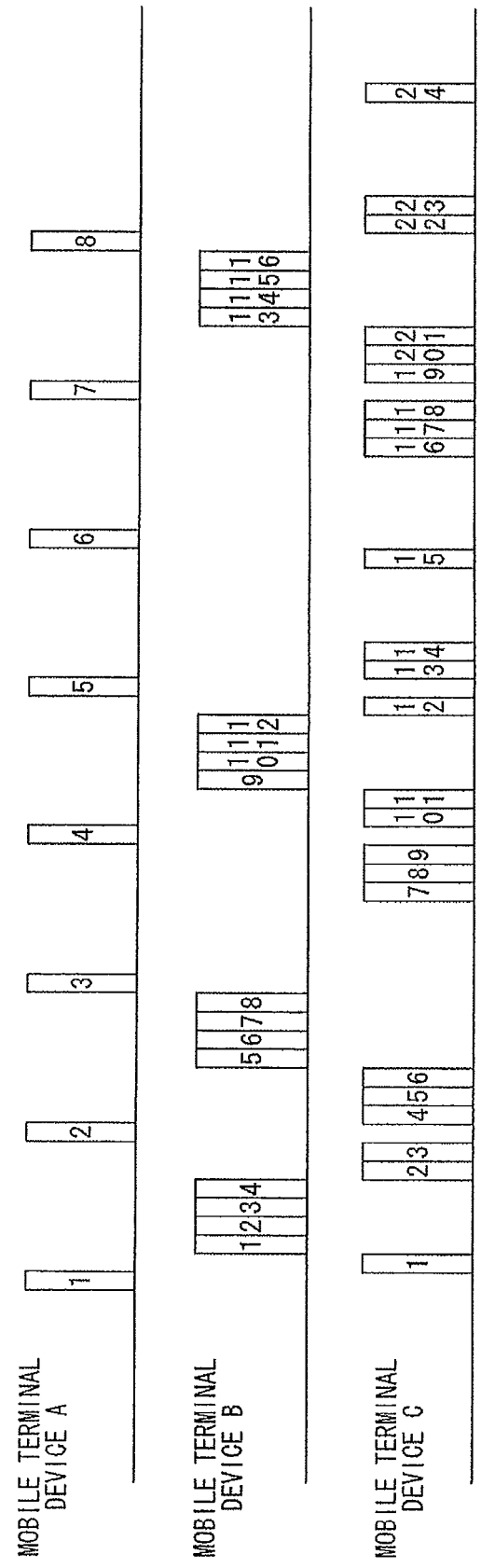
FIG. 23 illustrates an example of subcarrier allocation according to a sixth embodiment of the present invention.
Figure 24:
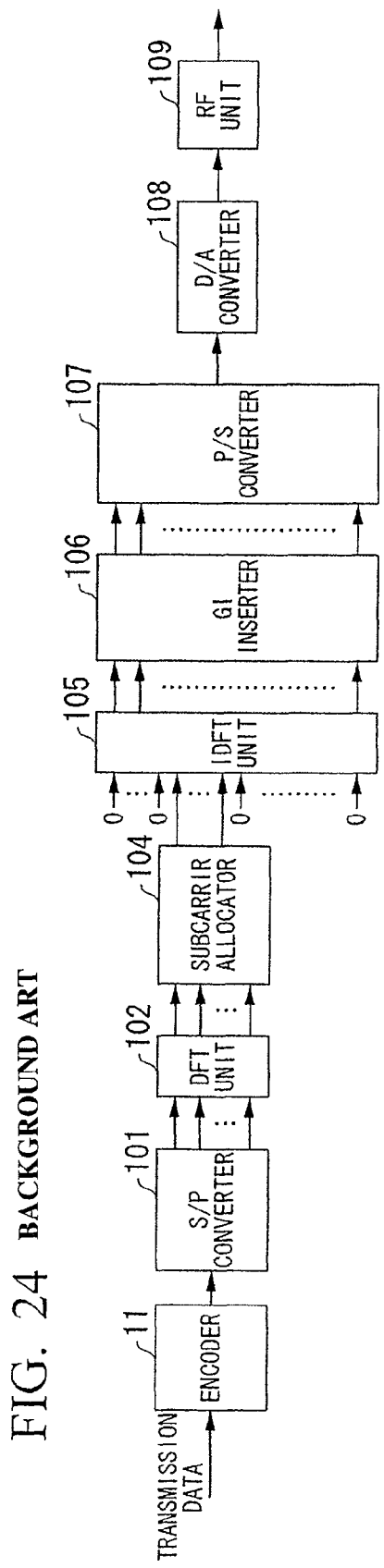
FIG. 24 is a schematic block diagram illustrating the configuration of a conventional DFT-s-OFDM transmitter.
Figure 25:
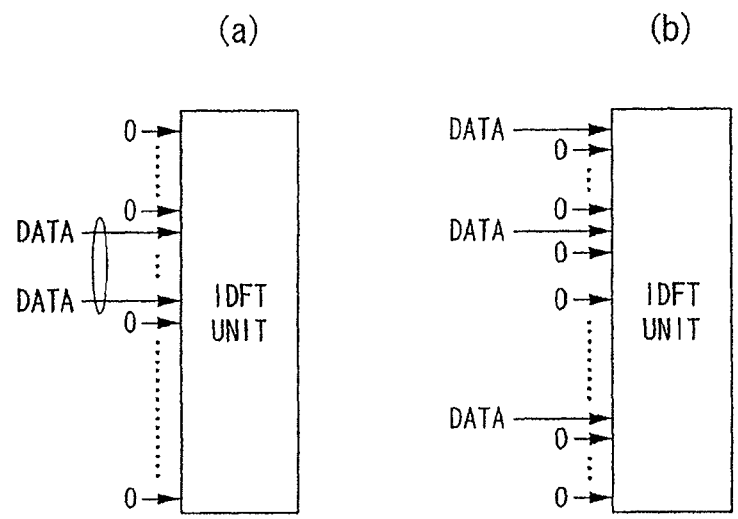
FIG. 25 illustrates a frequency allocation rule for inputs of an IDFT unit 105.
Figure 26:
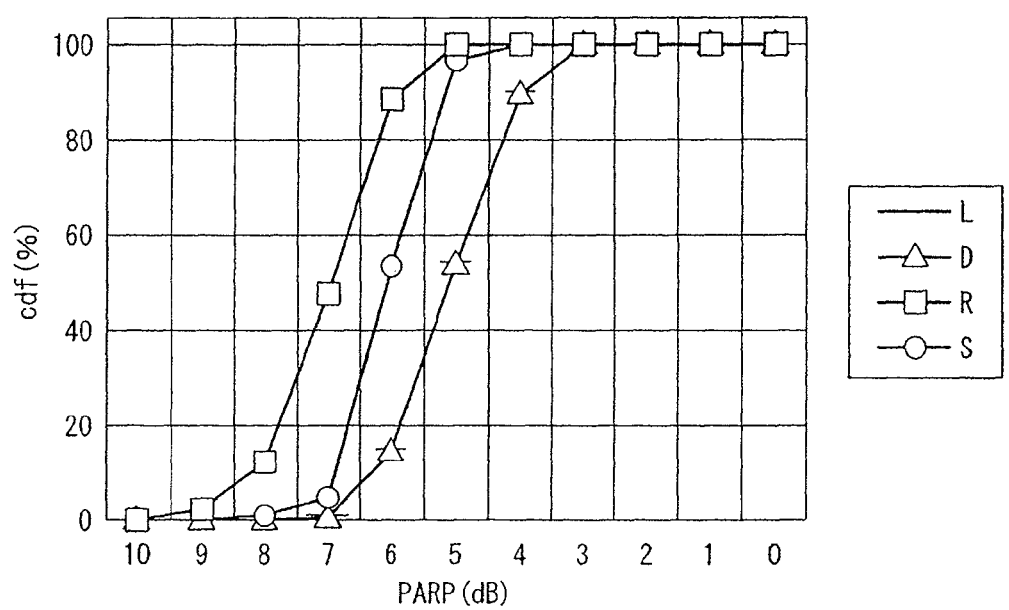
FIG. 26 illustrates an example of a PAPR distribution of outputs of the IDFT unit 105.
Figure 28:
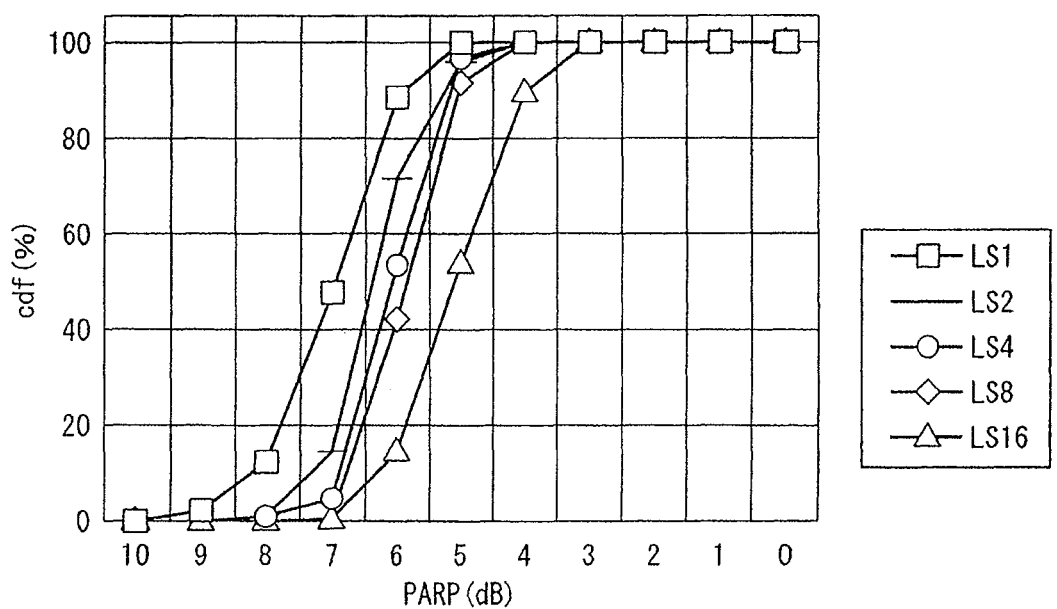
FIG. 28 illustrates a PAPR distribution when the number of frequency signals included in a cluster is changed in an LS allocation.

A sixth embodiment explains the case where subcarrier allocation is performed on a mobile terminal device moving fast. In the sixth embodiment, subcarrier allocation is performed simultaneously using the L-based allocation of the third embodiment and the D allocation. FIG. 23 illustrates an example of subcarrier allocation according to the sixth embodiment.

It is assumed in FIG. 23 that the total numbers of subcarriers to be used by the mobile terminal devices A, B, and C are 8, 16, and 24, respectively, and the number of subcarriers included in the entire band is 64 (16 subcarriers are unused).

In the positional relationship shown in FIG. 21, the mobile terminal device A is farthest from the base station device, the mobile terminal device B is the second farthest therefrom, and the mobile terminal device C is the closest thereto. The mobile terminal device A is assumed to be moving fast. In this case, the mobile terminal device A which is the farthest from the base station device and moving fast requires a large amount of transmission power, and therefore is allocated subcarriers such that intervals among subcarriers to be allocated are fixed (8 subcarrier interval in the case of FIG. 23) so that PAPR is small. Since a mobile terminal device moving fast has large channel time variation, it is difficult to achieve the multi-user diversity effect using a channel having good channel quality. For this reason, it is said that it is better to widen a band such as the D allocation in order to achieve the frequency diversity effect in the case of fast movement.

The mobile terminal device C closest to the base station device requires a small amount of transmission power, and therefore the PAPR may be large. Therefore, subcarriers are allocated without consideration of allocation intervals. The mobile terminal device B which is the second farthest from the base station device performs subcarrier allocation based on the allocation by which the segment division explained in the third embodiment is performed (it is assumed in FIG. 23 that the number of subcarriers included in a cluster is 4).

In this manner, subcarrier allocation in consideration of PAPR is enabled while a mobile terminal device moving fast can achieve the frequency diversity effect.

Dedicated hardware may implement: the SIP converter 1, the DPT emit 2, the segmenting unit 3, the subcarrier allocator 4, the IDFT unit 5, the GI inserter 6, the P/S converter 7, and the controller 10, which are shown in FIG. 1; the receiver 21, the transmitter 22, the subcarrier allocation receiver 42, the distance estimator 43, and the distance indicator 44, which are shown in FIG. 11; the receiver 51, the transmitter 52, and the subcarrier allocation determining unit 53, which are shown in FIG. 15; and the controller 60, the signal selector 61, and the subcarrier modulator 62, which are shown in FIG. 16. Each of those units may include memory and CPU (Central Processing Unit) and be implemented by programs for implementing functions of the respective units being loaded onto the memory and executed.

Although the embodiments of the present invention have been explained with reference to the accompanying drawings, the specific configuration is not limited thereto, and various modifications may be made without departing from the scope of the present invention.

INDUSTRIAL APPLICABILITY

The present invention is preferably used for a mobile communication system using spectrum controlled single carrier communication in an uplink from a mobile terminal device to a base station device.

The invention claimed is:

1. A base station device comprising:
   a receiver configured to receive a Discrete Fourier Transform-spread-OFDM (DFT-S-OFDM) signal from a transmission device, and to receive information indicating a limitation of an allocation method indicating how to map data to a plurality of subcarriers of the transmission device; and
   a transmitter configured to transmit allocation information indicating which of the plurality of subcarriers should be used to make the DFT-S-OFDM signal,
   wherein the allocation information is constituted by two allocation methods of allocating the plurality of subcarriers to the transmission device,
   wherein a first allocation method of said two allocation methods allocates the plurality of subcarriers continuously to form a single cluster of subcarriers, and
   wherein a second allocation method of said two allocation methods non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster.

2. The base station device according to claim 1, wherein the DFT-S-OFDM signal is generated by the transmission device converting a time-domain signal into a plurality of frequency-domain signals and allocating the plurality of frequency-domain signals onto the plurality of subcarriers indicated by the allocation information.

3. The base station device according to claim 1, further comprising:
   a subcarrier allocator configured to allocate one or more subcarriers to another transmission device, wherein the first cluster and the second cluster are non-continuously allocated by the first cluster and the second cluster being separated by said one or more subcarriers.

4. A transmission device comprising:
a receiver configured to receive, from a base station device, information indicating one of either a first allocation method and a second allocation method, wherein the first allocation method is a single cluster method such that a plurality of subcarriers are allocated continuously to form a single cluster of subcarriers, and wherein the second allocation method is a multi-cluster method such that the plurality of subcarriers are non-continuously allocated in at least a first cluster and a second cluster where the first cluster includes a first portion of the plurality of subcarriers continuously allocated to form the first cluster and where the second cluster includes a second portion of the plurality of subcarriers continuously allocated to form the second cluster;
a Discrete Fourier Transform (DFT) unit configured to generate a frequency signal;
a subcarrier allocator configured to allocate the frequency signal onto subcarriers based on the received information;
an Inverse Discrete Fourier Transform (IDFT) unit configured to convert the frequency signal allocated onto the subcarriers to a time-domain signal; and
a controller configured to control, based on the received information, a transmission power for transmitting data using the plurality of subcarriers,
wherein when the transmission power for transmitting the data is greater than a predetermined transmission power, the subcarrier allocator allocates the frequency signal onto subcarriers by using the first allocation method.

5. The transmission device according to claim 4, further comprising:
a transmitter configured to transmit, to the base station device, information indicating a limitation of an allocation method for the transmission device to arrange the plurality of subcarriers.

6. The transmission device according to claim 4, further comprising:
a transmitter configured to transmit information indicating one of the first and second allocation methods which is limited based on a condition of the transmission device.

7. A transmission device comprising:
a receiver configured to receive, from a base station device, information indicating one of either a first allocation method and a second allocation method as an allocation method to be allocated to the transmission device, wherein the first allocation method is a single cluster method such that a plurality of subcarriers are allocated continuously to form a single cluster of subcarriers, and wherein the second allocation method is a multi-cluster method such that the plurality of subcarriers are non-continuously allocated in at least a first cluster and a second cluster where the first cluster includes a first portion of the plurality of subcarriers continuously allocated to form the first cluster and where the second cluster includes a second portion of the plurality of subcarriers continuously allocated to form the second cluster;
a Discrete Fourier Transform (DFT) unit configured to generate a frequency signal;
a subcarrier allocator configured to allocate the frequency signal onto subcarriers based on the received information;
an Inverse Discrete Fourier Transform (IDFT) unit configured to convert the frequency signal allocated onto the subcarriers to a time-domain signal;
a controller configured to control, based on the received information, a transmission power for transmitting data using the plurality of subcarriers; and
an RF unit configured to transmit the time-domain signal by using the transmission power controlled by the controller.

8. A wireless communication system comprising:
a base station device; and
a transmission device,
wherein the base station device comprises:
    a first receiver configured to receive, from the transmission device, a Discrete Fourier Transform-spread-OFDM (DFT-S-OFDM) signal from a transmission device, and to receive information indicating a limitation of an allocation method indicating how to map data to a plurality of subcarriers of the transmission device; and
    a first transmitter configured to transmit, to the transmission device, allocation information indicating which of the plurality of subcarriers should be used to make the DFT-S-OFDM signal,
    wherein the allocation information is constituted by two allocation methods,
    wherein a first allocation method of said two allocation methods allocates the plurality of subcarriers continuously to form a single cluster of subcarriers, and
    wherein a second allocation method of said two allocation methods non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and
the transmission device comprises:
    a second receiver configured to receive, from the base station device, the allocation information; a Discrete Fourier Transform (DFT) unit configured to generate a frequency signal;
    a subcarrier allocator configured to allocate the frequency signal onto subcarriers based on the received allocation information;
    an Inverse Discrete Fourier Transform (IDFT) unit configured to convert the frequency signal allocated onto the subcarriers to a time-domain signal; and
    a controller configured to control, based on the received allocation information, a transmission power for transmitting data using the plurality of subcarriers,
    wherein when the transmission power for transmitting the data is greater than a predetermined transmission power, the subcarrier allocator allocates the frequency signal onto subcarriers by using the first allocation method.

9. A wireless communication system comprising:
a base station device; and
a transmission device,
wherein the base station device comprises:
    a first receiver configured to receive, from the transmission device, a Discrete Fourier Transform-spread-OFDM (DFT-S-OFDM) signal from a transmission device, and to receive information indicating a limitation of an allocation method indicating how to map data to a plurality of subcarriers of the transmission device;

a transmitter configured to transmit, to the transmission device, allocation information indicating which of the plurality of subcarriers should be used to make the DFT-S-OFDM signal, wherein the allocation information is constituted by two allocation methods of allocating the plurality of subcarriers to the transmission device, wherein a first allocation method of said two allocation methods allocates the plurality of subcarriers continuously to form a single cluster of subcarriers, and wherein a second allocation method of said two allocation methods non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and the transmission device comprises:

a second receiver configured to receive, from the base station device, the allocation information;

a Discrete Fourier Transform (DFT) unit configured to generate a frequency signal;

a subcarrier allocator configured to allocate the frequency signal onto subcarriers based on the received allocation information;

an Inverse Discrete Fourier Transform (IDFT) unit configured to convert the frequency signal allocated onto the subcarriers to a time-domain signal;

a controller configured to control, based on the received allocation information, a transmission power for transmitting data using the plurality of subcarriers; and an RF unit configured to transmit the time-domain signal by using the transmission power controlled by the controller.

10. A non-transitory computer-readable medium having instructions stored thereon, such that when the instructions are read and executed by a processor, the processor is configured to perform the steps of:

receiving a Discrete Fourier Transform-spread-OFDM (DFT-S-OFDM) signal from a transmission device;

receiving information indicating a limitation of an allocation method indicating how to map data to a plurality of subcarriers of the transmission device; and transmitting allocation information indicating which of the plurality of subcarriers should be used to make the DFT-S-OFDM signal, wherein the allocation information is constituted by two allocation methods of allocating the plurality of subcarriers to the transmission device, wherein a first allocation method of said two allocation methods allocates the plurality of subcarriers continuously to form a single cluster of subcarriers, and wherein a second allocation method of said two allocation methods non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster.

11. A non-transitory computer-readable medium having instructions stored thereon, such that when the instructions are read and executed by a processor, the processor is configured to perform the steps of:

receiving information indicating one of either a first allocation method and a second allocation method, wherein the first allocation method is a single cluster method such that a plurality of subcarriers are allocated continuously to form a single cluster of subcarriers, and wherein the second allocation method is a multi-cluster method such that the plurality of subcarriers are non-continuously allocated in at least a first cluster and a second cluster where the first cluster includes a first portion of the plurality of subcarriers continuously allocated to form the first cluster and where the second cluster includes a second portion of the plurality of subcarriers continuously allocated to form the second cluster;

generating a frequency signal;

allocating the frequency signal onto subcarriers based on the received information;

converting the frequency signal allocated onto the subcarriers to a time-domain signal; and controlling, based on the received information, a transmission power for transmitting data using the plurality of subcarriers, wherein when the transmission power for transmitting the data is greater than a predetermined transmission power, the subcarrier allocator allocates the frequency signal onto subcarriers by using the first allocation method.

12. A non-transitory computer-readable medium having instructions stored thereon, such that when the instructions are read and executed by a processor, the processor is configured to perform the steps of:

receiving information indicating one of either a first allocation method and a second allocation method as an allocation method to be allocated to the transmission device, wherein the first allocation method is a single cluster method such that a plurality of subcarriers are allocated continuously to form a single cluster of subcarriers, and wherein the second allocation method is a multi-cluster method such that the plurality of subcarriers are non-continuously allocated in at least a first cluster and a second cluster where the first cluster includes a first portion of the plurality of subcarriers continuously allocated to form the first cluster and where the second cluster includes a second portion of the plurality of subcarriers continuously allocated to form the second cluster;

generating a frequency signal;

allocating the frequency signal onto subcarriers based on the received information;

converting the frequency signal allocated onto the subcarriers to a time-domain signal;

controlling, based on the received information, a transmission power for transmitting data using the plurality of subcarriers; and transmitting the time-domain signal by using the controlled transmission power.

13. A wireless communication method for a base station device, comprising:

receiving a Discrete Fourier Transform-spread-OFDM (DFT-S-OFDM) signal from a transmission device;

receiving information indicating a limitation of an allocation method indicating how to map data to a plurality of subcarriers of the transmission device; and transmitting allocation information indicating which of the plurality of subcarriers should be used to make the DFT-S-OFDM signal, wherein the allocation information is constituted by two allocation methods of allocating the plurality of subcarriers to the transmission device, wherein a first allocation method of said two allocation methods allocates the plurality of subcarriers continuously to form a single cluster of subcarriers, and wherein a second allocation method of said two allocation methods non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster.

14. A wireless communication method for a transmission device, comprising:

receiving information indicating one of either a first allocation method and a second allocation method, wherein the first allocation method is a single cluster method such that a plurality of subcarriers are allocated continuously to form a single cluster of subcarriers, and wherein the second allocation method is a multi-cluster method such that the plurality of subcarriers are non-continuously allocated in at least a first cluster and a second cluster where the first cluster includes a first portion of the plurality of subcarriers continuously allocated to form the first cluster and where the second cluster includes a second portion of the plurality of subcarriers continuously allocated to form the second cluster;

generating a frequency signal;

allocating the frequency signal onto subcarriers based on the received information;

converting the frequency signal allocated onto the subcarriers to a time-domain signal; and controlling, based on the received information, a transmission power for transmitting data using the plurality of subcarriers, wherein when the transmission power for transmitting the data is greater than a predetermined transmission power, the subcarrier allocator allocates the frequency signal onto subcarriers by using the first allocation method.

15. A wireless communication method for a transmission device, comprising:

receiving information indicating one of either a first allocation method and a second allocation method as an allocation method to be allocated to the transmission device, wherein the first allocation method is a single cluster method such that a plurality of subcarriers are allocated continuously to form a single cluster of subcarriers, and wherein the second allocation method is a multi-cluster method such that the plurality of subcarriers are non-continuously allocated in at least a first cluster and a second cluster where the first cluster includes a first portion of the plurality of subcarriers continuously allocated to form the first cluster and where the second cluster includes a second portion of the plurality of subcarriers continuously allocated to form the second cluster;

generating a frequency signal;

allocating the frequency signal onto subcarriers based on the received information;

converting the frequency signal allocated onto the subcarriers to a time-domain signal;

controlling, based on the received information, a transmission power for transmitting data using the plurality of subcarriers; and transmitting the time-domain signal by using the controlled transmission power.

* * * * *